United States Patent
Toldo et al.

(10) Patent No.: US 11,049,274 B2
(45) Date of Patent: Jun. 29, 2021

(54) SYSTEM FOR ACQUIRING A 3D DIGITAL REPRESENTATION OF A PHYSICAL OBJECT

(71) Applicant: LEGO A/S, Billund (DK)

(72) Inventors: Roberto Toldo, Sona (IT); Simone Fantoni, Buttapietra (IT); Jesper Børlum, Horsens (DK); Francesca Garattoni, Vejle (DK)

(73) Assignee: LEGO A/S, Billund (DK)

( * ) Notice: Subject to any disclaimer, the term of this patent is extended or adjusted under 35 U.S.C. 154(b) by 58 days.

(21) Appl. No.: 16/349,476

(22) PCT Filed: Nov. 16, 2017

(86) PCT No.: PCT/EP2017/079368
§ 371 (c)(1),
(2) Date: May 13, 2019

(87) PCT Pub. No.: WO2018/095789
PCT Pub. Date: May 31, 2018

(65) Prior Publication Data
US 2020/0143554 A1   May 7, 2020

(30) Foreign Application Priority Data

Nov. 22, 2016 (DK) .......................... PA 2016 70928

(51) Int. Cl.
*G06T 17/20* (2006.01)
*G06T 7/593* (2017.01)

(52) U.S. Cl.
CPC .............. *G06T 7/593* (2017.01); *G06T 17/20* (2013.01); *G06T 2207/10028* (2013.01);
(Continued)

(58) Field of Classification Search
CPC ..................... G06T 7/593; G06T 17/20; G06T 2207/10028; G06T 2207/20004;
(Continued)

(56) References Cited

U.S. PATENT DOCUMENTS 6,711,293 B1   3/2004 Lowe
6,750,873 B1   6/2004 Fausto et al.
(Continued)

FOREIGN PATENT DOCUMENTS

EP   1519141 A2   3/2005
EP   1850270 A1   10/2007
(Continued)

OTHER PUBLICATIONS

Written Opinion of the International Preliminary Examining Authority, issued in corresponding international application No. PCT/EP2017/079368, dated Oct. 19, 2018.
(Continued)

*Primary Examiner* — Sheela C Chawan
(74) *Attorney, Agent, or Firm* — Day Pitney LLP; Valeriya Svystun

(57) ABSTRACT

A method for creating a digital 3D representation of a physical object, the physical object comprising an object surface; wherein the method comprises: obtaining input data, the input data including a plurality of captured images of the physical object and surface normal information of the object, the captured images being captured by an image capturing device, the surface normal information representing object surface normals associated with respective parts of the object surface; creating a digital 3D representation of the object surface; wherein creating the digital 3D representation is based on at least the obtained plurality of captured images and the obtained surface normal information.

21 Claims, 7 Drawing Sheets

(52) U.S. Cl.
CPC ............... *G06T 2207/20004* (2013.01); *G06T 2207/20028* (2013.01); *G06T 2207/20076* (2013.01)

(58) Field of Classification Search
CPC . G06T 2207/20028; G06T 2207/20076; G06T 7/55; G06T 7/521; G06T 2207/10016; G06T 2207/10024; G06T 2207/20036
USPC ........ 382/154, 108; 702/127, 150, 152, 153; 345/418, 419
See application file for complete search history.

(56) References Cited

U.S. PATENT DOCUMENTS

| | | | |
|---|---|---|---|
| 6,952,204 B2* | 10/2005 | Baumberg | G06T 17/10 345/420 |
| 7,602,234 B2* | 10/2009 | Wong | G05F 3/245 327/513 |
| 7,620,234 B2* | 11/2009 | Taylor | G06T 11/60 345/419 |
| 8,023,724 B2 | 9/2011 | Barbour | |
| 8,837,811 B2 | 9/2014 | Sinha et al. | |
| 9,409,084 B2 | 8/2016 | Horovitz et al. | |
| 10,074,160 B2* | 9/2018 | Kim | G06T 5/002 |
| 10,416,758 B2* | 9/2019 | Tsuchie | G06F 3/012 |
| 2002/0061130 A1 | 5/2002 | Kirk et al. | |
| 2003/0003801 A1 | 1/2003 | Bohmer et al. | |
| 2011/0298922 A1 | 12/2011 | Horovitz et al. | |
| 2013/0201187 A1 | 8/2013 | Tong et al. | |
| 2014/0219550 A1 | 8/2014 | Popa et al. | |
| 2015/0009214 A1 | 1/2015 | Lee et al. | |
| 2015/0178988 A1* | 6/2015 | Montserrat Mora | G06T 13/40 345/420 |
| 2015/0319421 A1 | 11/2015 | Chung et al. | |

FOREIGN PATENT DOCUMENTS

| | | |
|---|---|---|
| EP | 1519141 A3 | 3/2009 |
| EP | 1850270 B1 | 6/2010 |
| WO | WO 2015/185629 A2 | 12/2015 |

OTHER PUBLICATIONS

Pérez et al., "A Robust Method for Filling Holes in 3D Meshes Based on Image Restoration", J. Blanc-Talon et al. (Eds): ACIVS 2008, LNCS 5259, pp. 742-751, 2008.
Achanta, R., Shaji, A., Smith, K., Lucchi, A., Fua, P., & Susstrunk, S. (2011). SLIC Superpixels Compared to State-of-the-art Superpixel Methods, *Journal of Latex Class Files*, 6:1, pp. 1-8, Dec. 2011.
Achanta, R., Shaji, A., Smith, K., Lucchi, A., Fua, P., & Susstrunk, S. (2012). SLIC Superpixels Compared to State-of-the-art Superpixel Methods, *IEEE transactions on pattern analysis and machine intelligence*, 34(11), 2274-2281, Nov. 2012.
Allene, C., Pons, J., & Keriven, R. (2008). Seamless image-based texture atlases using multi-band blending, *19th International Conference, Pattern Recognition*, ICPR 2008.
Barsky, S., & Petrou, M. (2003). The 4-source photometric stereo technique for 3-dimensional surfaces in the presence of highlights and shadows, *IEEE Transactions on Pattern Analysis and Machine Intelligence*, 25(10), (37 pages).
Canny, J. (1986). A computational approach to edge detection. *IEEE Transactions on pattern analysis and machine intelligence*, vol. PAMI-8, No. 6, pp. 679-698, Nov. 1986.
Crandall, D., Owens, A., Snavely, N., & Huttenlocher, D. (2011). Discrete-continuous optimization for large-scale structure from motion, *IEEE Conference on Computer Vision and Pattern Recognition (CVPR)*, pp. 3001-3008.
Farenzena, M., Fusiello, A., & Gherardi, R. (2009). Structure-and-motion pipeline on a hierarchical cluster tree, *2009 IEEE 12th International Conference on Computer Vision Workshops (ICCV Workshops)*, (8 pages).

Furukawa, Y., Curless, B., Seitz, S. M., & Szeliski, R. (2010). Towards internet-scale multi-view stereo, *2010 IEEE Conference on Computer Vision and Pattern Recognition (CVPR)* , (8 pages).
Garland, M., & Heckbert, P. S. (1997), Surface simplification using quadric error metrics, *Proceedings of the 24th annual conference on Computer graphics and interactive techniques*, (8 pages).
Gherardi, R., & Fusiello, A. (2010). Practical autocalibration, *Computer Vision—ECCV 2010*, (12 pages).
Godard, C., Hedman, P., Li, W. & Brostow, G.J. (2015), *Multi-view reconstruction of highly specular surfaces in uncontrolled environments*, (9 pages).
Harris, C., & Stephens, M. (1988). A combined corner and edge detector, *Alvey vision conference*, Plessey Research Roke Manor, UK, (5 pages).
Esteban, C.H., & Schmitt, F. (2004), Silhouette and stereo fusion for 3D object modeling, *Computer Vision and Image Understanding*, (27 pages).
Vu. Hiep, Keriven, R., Labatut, P., & Pons, J.-P. (2009), Towards high-resolution large-scale multi-view stereo, *IEEE Conference on Computer Vision and Pattern Recognition*, CVPR 2009, (9 pages).
Katz, S., Tal, A., & Basri, R. (2007), Direct visibility of point sets, *ACM Transactions on Graphics.* . . vol. 26, No. 3, Article 24, Jul. 2007, (12 pages).
Kazhdan, M , Bolitho, M., & Hoppe, H. (2006), Poisson surface reconstruction, *Eurographics Symposium on Geometry Processing*, (10 pages).
Kolev, K, Pock, T. & Cremers, D., Anisotropic Minimal Surfaces Integrating Photoconsistency and Normal Information for Multiview Stereo, (Sep. 5, 2010), *Computer Vision—ECCV 2010, Part III*, LNCS 6313, pp. 538-551, Verlag Berlin Heidelberg, (14 pages).
Laurentini, A. (1994), The visual hull concept for silhouette-based image understanding, *IEEE Transactions on pattern analysis and machine intelligence*, 16(2), pp. 50-162, Feb. 1994.
Lee, K.W. & Wang, W.P. (2006), *Feature-Preserving mesh Denoising via Bilateral Normal Filtering*, (6 pages).
Lindeberg, T. (1998), Feature detection with automatic scale selection, *International Journal of Computer Vision*, 30(2), pp. 79-116.
Lowe, D. G. (1999), Object recognition from local scale-invariant features, *Proc. of the International Conference on Computer Vision*, Corfu, 8 pages.
Ma, W.C., Hawkins, T., Peers, P., Chabert, C.F., Weiss, M., & Debevec, P. (2007), Rapid Acquisition of Specular and Diffuse Normal Maps from Polarized Spherical Gradient Illumination, *Eurographics Symposium on Render* (2007), 12 pages.
Scheibe, K., Suppa, M., Hirschmüller, H., Strackenbrock, B., Huang, F., Liu, R. & Hirzinger, G., Multi-scale 3D-Modeling, (Jan. 1, 2006), *Advances in Image and Video Technology Lecture Notes in Computer Science*; LNCS, Springer, Berlin, DE, pp. 96-107, XP019052869, 12 pages.
Seitz, S. M., Curless, B., Diebel, J., Scharstein, D., & Szeliski, R. (2006), A comparison and evaluation of multi-view stereo reconstruction algorithms, *Proceedings of the 2006 IEEE Computer Society Conference on Computer Vision and Pattern Recognition (CVPR'06)*, 8 pages.
Tola, E., Lepetit, V., & Fua, P. (2010). Daisy: An efficient dense descriptor applied to wide-baseline stereo, *IEEE Transactions on Pattern Analysis and Machine Intelligence*, pp. 815-830.
Toldo, R., & Fusiello, A. (2008). Robust multiple structures estimation with j-linkage, *European conference on Computer Vision*, 12 pages.
Toldo, R., & Fusiello, A. (2010). Photo-consistent planar patches from unstructured cloud of points, *European Conference on Computer Vision*, 14 pages.
Toldo, R., Gherardi, R., Farenzena, M., & Fusiello, A. (2015). Hierarchical structure-and-motion recovery from uncalibrated images. *Computer Vision and Image Understanding*, 28 pages.
Triggs, B. (1997). Autocalibration and the absolute quadric, *Proceedings of the 1997 IEEE Computer Society International Conference on Computer Vision and Pattern Recognition*, pp. 609-614.
Triggs, B., McLauchlan, P. F., Hartley, R., & Fitzgibbon,A. (2000). Bundle adjustment—a modern synthesis, *International workshop on vision algorithms*, Corfu, Greece, (72 pages).

(56) References Cited

OTHER PUBLICATIONS

Vogiatzis, G., Hernadez, C., & Cipolla, R. *Reconstruction in the round using photometric normals*, (2006).
Waechter, Moehrle, N. & Goesele, M. (2014), Let there be color! Large-scale texturing of 3D reconstructions, *European Conference on Computer Vision*, , ECCV 2014, 15 pages.
Woodham, R. J. (1978), Photometric stereo: A reflectance map technique for determining surface orientation from image intensity, *Image Understanding Systems & Industrial Applications* (1978), SPIE vol. 155, pp. 136-143.
Wu, C. (2013). Towards linear-time incremental structure from motion, *2013 IEEE Computer Society International Conference on 3D Vision*, 8 pages.
Zheng, Y., Fu, H., Au, O.K.C. & Tai, C.L. (2011), Bilateral Normal Filtering for Mesh Denoising, *IEEE Transactions on Visualization and Computer Graphics*, 17:10, pp. 1521-1530, Oct. 2011.
International Search Report, issued in corresponding international application No. PCT/EP2017/079368, dated Dec. 14, 2017.
Written Opinion of the International Search Authority, issued in corresponding international application No. PCT/EP2017/079368, dated Dec. 14, 2017.
Danish Search Report and Search Opinion, issued in priority application No. PA 2016 70928, dated Jun. 14, 2017.

\* cited by examiner

SYSTEM FOR ACQUIRING A 3D DIGITAL REPRESENTATION OF A PHYSICAL OBJECT

CROSS-REFERENCE TO RELATED APPLICATIONS

This application is a U.S. National Stage of International Application No. PCT/EP2017/079368, filed on 16 Nov. 2017 and published on 31 May 2018, as WO 2018/095789 A1, which claims the benefit of priority to Danish Patent Application No. DK PA201670928, filed on 22 Nov. 2016. The content of each of the above referenced patent applications is incorporated herein by reference in its entirety for any purpose whatsoever.

FIELD OF THE INVENTION

The invention relates to methods and apparatus for obtaining a 3D digital representation of a physical object. In particular, the invention relates to toy enhanced game systems comprising such methods and apparatus, e.g. including systems comprising toy construction elements having coupling members for detachably interconnecting the toy construction elements with each other.

BACKGROUND

Toy construction systems have been known for decades. Over the years, simple box-shaped building blocks have been supplemented with other construction elements with either a specific appearance or a mechanical or electrical function to enhance the play value. Such functions include e.g. motors, switches and lamps, but also programmable processors that accept input from sensors and can activate function elements in response to received sensor inputs.

Several attempts have been made to control virtual game play by means of physical toys. Many such systems require the toy to be communicatively coupled to a computer by a wired or wireless connection. However, these prior art systems require a communications interface between the toy and a computer system. Moreover, the above prior art toys are relatively complicated and include electronic components or even a memory and a communications interface. Also, the degree of freedom when building the toy from accessory parts may be limited.

Other systems use vision technology in the context of toy enhanced games. For example, US 2011/298922 discloses a system for extracting an image of a physical object. The extracted image can be digitally represented on a display device as part of a virtual world, or video game, where the objects inhibiting the virtual world and/or video game, were designed and built from the construction set in the real-world. However, in many video games or other virtual environments it is desirable to provide three-dimensional virtual objects that accurately resemble a physical object.

Generally, a process for creating three-dimensional (3D) models from a set of multiple images is referred to as 3D reconstruction from multiple images. In the following, a 3D model of a physical object is also referred to as a digital representation of the 3D shape of a physical object.

According to at least one aspect, it is thus desirable to provide a process for creating digital representation of the three-dimensional (3D) shape of a physical objects in a user-friendly manner, e.g. digital representations of the 3D shape of physical toy construction models. In particular, it is desirable to provide a method that is easy to use and that provides digital representations that accurately represent the 3D shape of the physical object. It is generally desirable that such a method is robust in respect of factors such as ambient lighting conditions, mechanical inaccuracies of the apparatus used, and/or other factors.

It is generally desirable to provide a method and apparatus that enhances the educational and/or play value of a toy system, e.g. a toy-enhanced game system. It is also desirable to provide a toy construction system wherein a set of construction elements may easily be used in different toy construction models and/or in combination with existing toy construction elements. Moreover it is desirable to provide a toy construction system that allows users, in particular children, to construct multiple toy models in a user-friendly, efficient, yet flexible and reliable manner. In particular, it is desirable to provide a toy construction system that allows a user-friendly and flexible manner of creating virtual objects in a virtual environment such as a game system.

SUMMARY

According to a first aspect, disclosed herein is a method for creating a digital representation of at least an object surface of a physical object. Generally, the object surface is a surface in 3D space that includes surface parts having respective orientations in 3D space.

The method comprises:
  obtaining input data, the input data including a plurality of captured images of the physical object and surface normal information of the object, the surface normal information representing object surface normals associated with respective parts of the object surface;
  creating a digital representation of at least the object surface;
wherein creating the digital representation of the object surface is based on at least the obtained plurality of captured images and the obtained surface normal information and comprises:
  obtaining an intermediate representation of the object surface, the intermediate representation comprising a first part representing a first part of the object surface;
  modifying the first part of the intermediate representation to obtain a modified representation;
wherein modifying the first part of the intermediate representation comprises:
  determining a second part of the object surface within a proximity of the first part of the object surface;
  determining, from the obtained surface normal information, one or more object surface normals associated with the determined second part;
  modifying the first part of the intermediate representation based at least in part on the determined one or more object surface normals.

Embodiments of such a process will also be referred to as a 3D object reconstruction process or 3D reconstruction pipeline.

Accordingly, embodiments of the method described herein use information not only from the plurality of captured images but also information about object surface normals of the object, thereby increasing the quality of the reconstructed digital representation of the 3D shape of the physical object. In particular, the object surface normals represent object surface normals of the physical object rather than virtual surface normals that are derived from a created 3D surface representation of the object, i.e. that represent the orientation of the virtual surface of the created digital 3D representation. The obtained object surface normals may also be referred to as "external" surface normals, as they are derived from a source different from a created digital 3D surface representation, e.g. different from a mesh representation of a virtual 3D surface. The external object surface normals may e.g. be obtained as normal maps that represent surface normals of surfaces seen from a given viewpoint, e.g. a camera viewpoint. A normal map may thus be a 2D array of normal vectors.

When the process selectively uses information about object surface normals related to a proximity of a part of the surface in order to modify the digital representation of this part, a particularly high quality of reconstruction may be achieved, e.g. for objects with many plane, smooth surfaces and distinct edges.

The modification of the first part of the intermediate representation is based selectively on object normals associated with the second part of the object surface, i.e. based on the surface normals associated with the second part only. Hence, the modification of the intermediate representation is based on local normal information only, rather than on global normal information associated with all parts of the object surface. It will be appreciated, however, that the process may include additional steps that indeed depend on global normal information. The modification is at least in part based on surface normal information, i.e. the modification may further be based on information other than surface normal information.

The proximity may be based on a suitable distance measure, e.g. a distance measure applied to the intermediate representation. Examples of distance measures include a Euclidean distance. The proximity may also be defined as a neighborhood of vertices and/or surface elements of a mesh representation, e.g. a one-ring of vertices or a k-ring of vertices, where k is a positive integer, e.g. k=1. The first part of the intermediate representation may represent a point or an area of the object surface and/or of a virtual surface defined by the intermediate representation. The second part may include some or all of the first part; alternatively, the second part may be disjoint from the first part. For example, the first part may be a point or an area and the second part may surround the first part, e.g. a periphery surrounding an area defining the first part. In some embodiments, the first part may be a first vertex and the second part may be a part of the object surface represented by the surface elements defined by the vertices surrounding the first vertex, e.g. by the vertices of a 1-ring (or by a higher-order ring) around the first vertex.

The digital representation may be any suitable representation of at least the surface of the object and, in particular of the shape of the surface of the object in 3D space, suitable to provide a digital 3D model of the physical object. In some embodiments, the digital representation comprises a mesh of surface elements, e.g. planar surface elements, that together define a virtual surface in a virtual 3D space. The surface elements may e.g. be triangles or other types of polygons that are defined by a set of vertices. Other examples of digital representations include a voxel representation.

The captured images generally represent a view of a scene from a given viewpoint; an image may thus be regarded as a projection from a 3D scene onto a 2D image plane. The plurality of captured images may comprise images captured from respective viewpoints relative to the physical objects. Preferably, the plurality of images comprises more than two images. The images may be indicative of light intensity and/or color information, e.g. respective intensities for different colors/wavelengths, at respective image locations. The captured images may be captured by an image capturing device, e.g. an image capturing device comprising one or more digital cameras and/or one or more depth cameras, e.g. as described below. In some embodiments, an image capturing device provides additional information such as depth information, polarisation information, or other types of information; in some embodiments, such information may be provided by an image capturing device as a separate data structure or signal, in addition to the images; alternatively such additional information may be provided as part of a single data structure that includes the captured image and the additional information.

Each of the object surface normals may be indicative of a direction of the object surface at a location, in particular a point, on the object surface associated with the object surface normal, i.e. the surface normal may be indicative of a vector pointing outwards from a point of the surface in a direction normal to a tangential plane in said point. The surface normal information may comprise a plurality of normal maps, each normal map may define a 2D array where each element of the array represents a surface normal. In some embodiments some or all of the captured images have a corresponding normal map associated with them. In particular, the normal map associated with a captured image may represent surface normal associated with respective pixels or groups of pixels of the captured image.

The creation of a normal map may be performed by the image capturing device or by a processing device, e.g. as a pre-processing step preceding the reconstruction pipeline. To this end, various methods for extracting normal maps can be used to obtain the surface normal information. As a non-limiting example, the normal map can be generated by photometric stereo algorithms as in (Woodham, 1979) and (Barsky & Petrou, 2003).

The surface normal information may be used at different stages of a reconstruction process, i.e. they may be used to modify different types of intermediate representations.

Moreover, the modification of the intermediate representation to obtain a modified representation may be part of an iterative process where the intermediate representation may be an obtained modified representation of a previous iteration of the iterative process and/or where the modified representation is used as in intermediate representation that serves as input to a subsequent iteration of the iterative process.

Generally a process for object reconstruction may comprise a plurality of sub-processes and, in particular, a pipeline of sub-processes where subsequent sub-processes use the results/output of earlier sub-processes of the pipeline. One or more of the sub-processes of the pipeline may thus create one or more intermediate representations that are used as an input by one or more subsequent sub-processes of the pipeline. Some processes may create multiple intermediate representations. Hence, the term intermediate representation is intended to refer to an output of a sub-process of the overall process which output is used by one or more subsequent sub-processes of the overall process for creating the final representation of an object surface that is the output of the overall process. Depending on the stage along the pipeline, the intermediate representation may have a variety of forms. For example, the intermediate representation may be a depth map. Other examples of intermediate representations include a preliminary surface mesh that is to be refined in a subsequent sub-process of the reconstruction pipeline. Similarly, the modified intermediate representation may be a modified depth map, a modified surface mesh, etc.

Accordingly, the intermediate representation may be the output of a previous step of a reconstruction pipeline or may be a modified representation resulting from a previous iteration of an iterative process. The modified representation may be the final representation created by the process or it may be another intermediate representation which is further processed to obtain the final representation. The modified representation may thus serve as an input to a subsequent iteration of an iterative process or as an input to a subsequent step of a reconstruction pipeline.

In some embodiments, the intermediate representation comprises a depth map indicative of distances from a reference position to respective positions on the object surface. Such a depth map may e.g. be created during the initial stages of a reconstruction process, e.g. by a structure from motion process, a multi-view stereo process or the like. In other embodiments, the depth map may at least partly be obtained based on depth information received from a depth camera or similar device. In any event, depth maps often include holes, i.e. areas with no or little reliable depth information. This may e.g. be the case when an object has many plane, smooth surfaces without many features that are useful in a multi-view stereo approach.

Accordingly, the first part of the object surface may comprise or be a hole in the depth map and modifying the intermediate representation may comprise filling the hole using the surface normal information, thereby increasing the quality of the depth map. This, in turn, may facilitate subsequence stages of the reconstruction process and improve the quality of the final digital representation resulting from the reconstruction process.

In some embodiments, determining a second part within a proximity of the first part comprises identifying the hole as a hole to be filled and determining a periphery of the hole, i.e. the second part may be determined as the periphery of the hole or as a part of the periphery—or at least as comprising the periphery or a part thereof.

In some embodiments, creating the intermediate representation comprises creating the depth map from the plurality of images, e.g. by performing a structure from motion process and/or a multi-view stereo correspondence analysis. Alternatively, the depth map may be obtained from a depth camera.

In some embodiments, identifying the hole as a hole to be filled comprises
identifying the hole in the depth map
determining, based on the obtained surface normal information, whether the identified hole is a hole to be filled.

A hole in the depth map may be determined as an area in the depth map with missing data or with sparse and/or unreliable data.

In some embodiments, determining whether the identified hole is a hole to be filled comprises determining a first set of object surface normals associated with the determined periphery of the hole; computing a first similarity measure of the determined first set of object surface normals; and comparing the computed first similarity measure with a first target similarity value.

Additionally or alternatively, determining whether the identified hole is a hole to be filled comprises determining a second set of object surface normals associated with the identified hole, e.g. surface normals associated with points within the hole; computing a second similarity measure of the determined second set of object surface normals; and comparing the computed second similarity measure with a second target similarity value. Accordingly, when a hole is identified as a hole to be filled only when the second similarity measure is larger than the second similarity value, only holes that are relatively uniform are determined as holes to be filled.

Additionally or alternatively, determining whether the identified hole is a hole to be filled comprises determining a first set of object surface normals associated with the determined periphery of the hole and a second set of object surface normals associated with the identified hole; computing a compatibility measure of the first and second sets of object surface normal; and comparing the computed compatibility measure with a target compatibility value. Accordingly, when a hole is identified as a hole to be filled only when the compatibility measure is larger than the compatibility value, only holes that are likely caused by unreliable depth information are filled while preserving holes in the depth map that likely represent actual holes in the object.

Filling the hole may comprise computing depth values for one or more locations within the hole, e.g. using depth values and/or object surface normals associated with the determined periphery. The modified intermediate representation may thus be a modified depth map where one or more, or even all, holes have been filled.

In some embodiments, the method comprises an optimisation step for increasing a photoconsistency measure between the digital representation and the captured input data and/or a normal map derived from said surface normal information. Generally, a photoconsistency measure measures the degree of agreement/similarity, i.e. consistency, between a set of input images and a 3D surface geometry of a model of the scene being captured in the input images. An optimisation step for increasing a photoconsistency measure may thus iteratively modify the digital representation (i.e. the currently reconstructed surface), e.g. modify a surface mesh, e.g. by modifying vertex positions of the surface mesh, so as to increase the photoconsistency measure. Hence, the optimisation step may receive an intermediate representation in the form of a surface mesh and create a modified intermediate representation in the form of a modified surface map that results in an increased photoconsistency measure in respect of the captured images and/or surface normals.

When the photoconsistency measure comprises a consistency measure between the obtained surface normal information and surface normal information obtained from the modified representation, the quality of the reconstructed object surface may be further increased.

Generally, according to another aspect, disclosed herein are embodiments of a method for creating a digital representation of a least an object surface of a physical object; wherein the method comprises:
obtaining input data, the input data including a plurality of captured images of the physical object and surface normal information of the object, the surface normal information representing object surface normals associated with respective parts of the object surface;
creating a digital representation of the object surface;
wherein creating the digital representation is based on at least the obtained plurality of captured images and the obtained surface normal information and comprises:
obtaining an intermediate representation of the object surface;
modifying, based at least in part on the obtained surface normal information, a first part of the intermediate representation to obtain a modified representation, the first part of the intermediate representation representing a first part of the object surface;

wherein modifying the first part of the intermediate representation comprises an optimisation step for increasing a photoconsistency measure between the intermediate representation and a normal map derived from said surface normal information.

In some embodiments, modifying the intermediate representation to obtain a modified representation comprises performing a bilateral filtering step, optionally followed by an optimisation step for increasing a photoconsistency measure between the modified representation and the captured input data and/or a normal map derived from said surface normal information.

Accordingly, the bilateral filtering step provides a suitable starting point for the optimisation step, thus reducing the risk that the optimisation step results in a local, spurious optimum, thereby increasing the quality of the reconstructed object surface.

In some embodiments, the intermediate representation defines a virtual surface in a virtual 3D space and comprises a mesh of surface elements; each surface element defines a virtual surface normal; each surface element comprises a plurality of vertices, each vertex defining a position on said virtual surface. The bilateral filtering step comprises modifying a position of at least a first vertex of said plurality of vertices by a vertex displacement computed to reduce a difference measure between one or more object surface normals determined from the obtained surface normal information and corresponding one or more virtual surface normals. The one or more virtual surface normals are indicative of the orientation of respective surface elements in a proximity of the first vertex, and the one or more object surface normals are indicative of an orientation of the object surface at respective 3D positions corresponding to the positions of the surface elements within said proximity. Hence, as mentioned above, in some embodiments the first part of the intermediate representation may be a first vertex of the mesh of surface elements.

In particular, the mesh defines a surface topology of the object and, in some embodiments, the vertex displacement is restrained by the mesh topology. For example, the displacement of a first vertex may be computed based only on information associated with surface elements in a proximity of the first vertex. In some embodiments, the first vertex is associated with one or more surface elements and the vertex displacement is scaled by a size of the one or more surface elements associated with the first vertex.

In some embodiments, each of the object surface normals determined from the obtained surface normal information is an object surface normal that is indicative of the object surface orientation at a position corresponding to one of the surface elements in the proximity of the first vertex and that is selected from the surface normals represented by the obtained surface normal information, e.g. the object surface normal that is closest to an average of all surface normals of the obtained surface normal information that are associated with said surface element in the proximity of the first vertex. For example, for each surface element n the proximity of the first vertex, a surface normal may be selected among candidate surface normals of respective normal maps where the candidate surface normals represent the part of the object surface that is associated with said surface element. Hence, in some embodiments, the bilateral filtering step comprises selecting one of the actual object surface normals represented by the obtained surface normal information and associating the selected surface normal with a surface element associated with the first vertex, thereby providing an improved edge preservation.

The present disclosure relates to different aspects including the methods described above and in the following, corresponding apparatus, systems, methods, and/or products, each yielding one or more of the benefits and advantages described in connection with one or both of the first mentioned aspects, and each having one or more embodiments corresponding to the embodiments described in connection with one or both of the first mentioned aspects and/or disclosed in the appended claims.

In particular, disclosed herein are embodiments of a system for creating a digital representation of a physical object; the system comprising a data processing system configured to perform the steps of an embodiment of one or more of the methods disclosed herein.

To this end, the data processing system may comprise or be connectable to a computer-readable medium from which a computer program can be loaded into a processor, such as a CPU, for execution. The computer-readable medium may thus have stored thereon program code means adapted to cause, when executed on the data processing system, the data processing system to perform the steps of the method described herein. The data processing system may comprise a suitably programmed computer such as a portable computer, a tablet computer, a smartphone, a PDA or another programmable computing device having a graphical user-interface. In some embodiments, the data processing system may include a client system, e.g. including a camera and a user interface, and a host system which may create and control the virtual environment. The client and the host system may be connected via a suitable communications network such as the internet.

Here and in the following, the term processor is intended to comprise any circuit and/or device suitably adapted to perform the functions described herein. In particular, the above term comprises general- or special-purpose programmable microprocessors, such as a Central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

In some embodiments, the system comprises a scanning station comprising an object support for receiving a physical object. The object support may be a static object support or a movable object support. For example, the object support may be a turntable configured to rotate around an axis of rotation so as to allow the image capturing device to capture multiple images of a physical object placed on the turntable from different viewpoints relative to the object. The turntable may comprise markers, e.g. along a circumference of the turntable and the data processing system may be configured, based on one or more captured images, to determine an angular position of the turntable associated with the captured images. The data processing system may further be configured to detect a tilt or other displacement of the turntable relative to the image capture device, so as to allow computation, for the two or more images, of respective viewpoints relative to the physical object from which the respective images have been captured. For example, this determination may be performed by a structure from motion technique.

In some embodiments, the system further comprises an image capturing device operable to capture two or more images of a physical object, e.g. when the physical object is placed on the object support, wherein the two or more images are taken from different viewpoints relative to the physical object.

The image capturing device may comprise one or more sensors that detect light or other forms of electromagnetic radiation, such as light or other electromagnetic radiation reflected by surfaces of a physical object in a field of view of the image capturing device. The image capturing device may comprise an array of sensors, such as a CCD chip, or a single sensor that is operable to scan across a field of view, or a combination of a number of sensors that are scanned. Hence, the physical object may be passive in that it does not need to actively emit any sound, light, radio-signals, electrical signals, or the like. Moreover, the images may be captured in a contactless fashion without the establishment of any electrical contact, communications interface or the like.

The image capturing device may comprise a radiation source, e.g. a light source, operable to direct radiation towards the physical object. For example, the image-capturing device may comprise a flash-light, one or more LEDs, a laser, and/or the like. Alternatively, the image capturing device may be operable to detect ambient radiation reflected by the object. Here, the term reflection is intended to refer to any type of passive emission responsive to received radiation or waves, including diffuse reflection, refraction, etc.

The image may be a picture or another form of two-dimensional representation of a field of view of the image capturing device which representation allows the determination of a shape and/or colour and/or size of an object within the field of view. For example, the image capturing device may comprise a digital camera responsive to visible light, to infrared light, and/or the like. In some embodiments, the camera may be a 3D camera operable to also detect distance information of respective points within the field of view relative to the camera position. Another example of an image capturing device may comprise a digital camera adapted to obtain data of a local polarisation of the light, e.g. for each pixel of a sensor array or for groups of pixels of a sensor array. Such a camera may be operable to obtain a 2D map of respective polarisations and/or surface normals of respective surface points within the field of view of the image capturing device. Accordingly, the captured image may be represented as a 2D array of pixels or other array elements, each array element representing sensed information associated with a point or direction within the field of view. The sensed information may include an intensity of a received radiation or wave and/or a frequency/wavelength of the received radiation or wave. In some embodiments the 2D array may include additional information such as a distance map, a polarisation map, a map of surface normal, and/or other suitable sensed quantity. Hence, the 2D array may include image data and, optionally, additional information.

In some embodiments the image capturing device comprises one or more digital cameras, e.g. two digital cameras adapted at respective viewpoints relative to the physical object, e.g. at respective elevations relative to the physical object. In some embodiments, the digital camera is configured to capture depth information in addition to light intensity data (such as RGB data). In some embodiments, the digital camera is configured to capture information indicative of surface normal of one or more surfaces within a field of view of the digital camera. For example, the digital camera may be configured to obtain polarisation data of the received light. The camera and/or the data processing system may be configured to determine local surface normals from the obtained polarisation data. The captured surface normals may also be transformed into a world coordinate system based on the detected tilt or other displacements of the turntable relative to the camera. Examples of camera sensors that are capable of detecting surface normal include the system disclosed in U.S. Pat. No. 8,023,724. Other examples of techniques for determining surface normal include the techniques described in "Rapid Acquisition of Specular and Diffuse Normal Maps from Polarized Spherical Gradient Illumination" by Wan-Cun Ma et al., Eurographics Symposium on Rendering (2007), Jan Kautz and Sumanta Pattanaik (Editors).

The data processing system may then be adapted to create a digital 3D model from the light intensity data and from the polarisation data and/or surface normal data and/or depth information as described herein.

Consequently, a plurality of captured images and, optionally, additional information, of the physical object, e.g. of a physical toy construction model, may be used as a basis for generating a virtual object having a three-dimensional graphical representation that accurately corresponds to the 3D shape of the physical object. Based on the captured images, the process may then automatically create a virtual object including its three-dimensional graphical representation.

In some embodiments, the system further comprises a plurality of toy construction elements configured to be detachably interconnected with each other so as to form a physical object in the form of a toy construction model. The toy construction elements may each comprise one or more coupling members configured for detachably interconnecting the toy construction elements with each other.

Consequently, one or more simple, captured images of the physical toy construction model may be used as a basis for generating a virtual object having a user-defined appearance in the virtual environment. A user may create a physical toy construction model resembling an object to be used as a virtual object in a computer-generated virtual environment. As the user may construct these objects from toy construction elements, the user has a large degree of freedom as to how the object is constructed. Moreover, the system provides the user with a flexible, yet easy-to understand and easy-to use mechanism for influencing the desired appearance of the virtual object in the virtual environment.

The process may even comprise assigning virtual attributes, e.g. behavioural attributes such as capabilities, needs, preferences or other attributes of the virtual object, or other game-related attributes to a virtual object, e.g. based on detected visual attributes of the physical object, e.g. by using a mechanism as disclosed in co-pending international patent application PCT/EP2015/062381.

The construction elements of the system may each have a color, shape and/or size selected from a predetermined set of colors, shapes and/or sizes, i.e. the toy construction system may only comprise toy construction elements of a limited, predetermined range of predetermined colors, shapes and/or sizes. The determined visual attribute may at least partly, if not completely, be defined by the colors, shapes and sizes of the shapes of the toy construction elements as well as their relative positions and orientations within the constructed toy construction model. Hence, while a toy construction system may provide a large number of building options and allows constructing a vast variety of toy construction models, the degrees of freedom of constructing toy construction models are restricted by the properties of the individual toy construction elements and by the construction rules imposed by the toy construction system. For example, the colors of a toy construction model are limited to the set of colors of the individual toy construction elements. Each toy construction model has a shape and size that is at least in part defined by the shapes and sizes of the individual toy construction elements and by the ways they can be interconnected.

Hence, the visual attributes of the toy construction model that may be determined by the processor may be determined from a set of predetermined visual attributes. Accordingly, the behavioral attributes of the created virtual object may in some embodiments only be created from a set of predetermined behavioral attributes corresponding to the set of predetermined visual attributes consistent with the toy construction system.

The various aspects described herein may be implemented with a variety of game systems, e.g. computer-generated virtual environments in which virtual objects are controlled by a data processing system to exhibit a behaviour within the virtual environment and/or where a virtual object has associated attributes that influence the game-play of a videogame or other evolution of a virtual environment.

Generally, a virtual object may represent a virtual character such as a human-like character, an animal-like character, a fantasy creature, etc. Alternatively, a virtual object may be an inanimate object, such as a building, a vehicle, a plant, a weapon, etc. In some embodiments, virtual objects whose counterparts in the physical world are inanimate, e.g. a car, may be used as an animate virtual character in a virtual environment. Hence, in some embodiments the virtual object is a virtual character and, in some embodiments, the virtual object is an inanimate object.

A virtual character may exhibit behaviour by moving around within the virtual environment, by interacting with or generally engaging other virtual characters and/or with inanimate virtual objects present in the virtual environment and/or with the virtual environment itself and/or by otherwise developing within the virtual environment, e.g. growing, aging, developing or loosing capabilities, attributes or the like. Generally, virtual objects may have attributes, e.g. a capability, that influence the game play or other evolution of a virtual environment. For example, a car may have a certain maximum speed, or an object may have an attribute that determines whether or how a virtual character may interact with the virtual object, and/or the like.

Hence, a computer-generated virtual environment may be implemented by a computer program executed on a data processing system and causing the data processing system to generate a virtual environment and to simulate the evolution of the virtual environment over time, including the behaviour of one or more virtual characters and/or the attributes of one or more virtual objects within the virtual environment. For the purpose of the present description a computer-generated virtual environment may be persistent, i.e. it may continue to evolve and exist even when no user interacts with it, e.g. between user sessions. In alternative embodiments, the virtual environment may only evolve as long as a user interacts with it, e.g. only during an active user session. A virtual object may be at least partly user-controlled, i.e. the data processing system may control the behaviour of a virtual object at least partly based on received user inputs. A computer-generated virtual environment may be a single-user environment or a multi-user environment. In a multi-user environment more than one user may interact with the virtual environment concurrently, e.g. by controlling respective virtual characters or other virtual objects in the virtual environment. Computer-generated virtual environments and, in particular, persistent, multi-user environments are sometimes also referred to as virtual worlds. Computer-generated virtual environments are frequently used in game systems, where a user may control one or more virtual characters within the virtual environment. A virtual character controlled by the user is sometimes also referred to as "the player." It will be appreciated that the at least some embodiments of the aspects described herein may also be used in contexts other than game play. Examples of computer-generated virtual environments may include but are not limited to videogames, e.g. games of skill, adventure games, action games, real-time strategy games, role play games, simulation games, etc. or combinations thereof.

The data processing system may present a representation of the virtual environment including a representation of one or more virtual objects such as virtual characters within the virtual environment, and including the evolution of the environment and/or virtual object over time.

The present disclosure further relates to a computer program product comprising program code means adapted to cause, when executed on a data processing system, said data processing system to perform the steps of one or more of the methods described herein.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network, or an application for download to a mobile device from an App store.

The present disclosure further relates to a data processing system configured to perform the steps of an embodiment of one or more of the methods disclosed herein.

The present disclosure further relates to a toy construction set comprising a plurality of toy construction elements and instructions to obtain a computer program computer program code that causes a data processing system to carry out the steps of an embodiment of one or more of the methods described herein, when the computer program code is executed by the data processing system. For example, the instructions may be provide in the form of an internet address, a reference to an App store, or the like. The toy construction set may even comprise a computer-readable medium having stored thereon such as computer program code. Such a toy construction set may even comprise a camera or other image capturing device connectable to a data processing system.

BRIEF DESCRIPTION OF THE DRAWINGS

FIG. 2 illustrates a 3D reconstruction pipeline from the inputting of 2D photos to the creation of a 3D textured model.

DETAILED DESCRIPTION

Various aspects and embodiments of a process and system for reconstructing 3D objects from 2D image data will now be described, partly with reference to toy construction elements in the form of bricks. However, the invention may be applied to other forms of physical objects, such as other forms of construction elements for use in toy construction sets.

Figure 1:
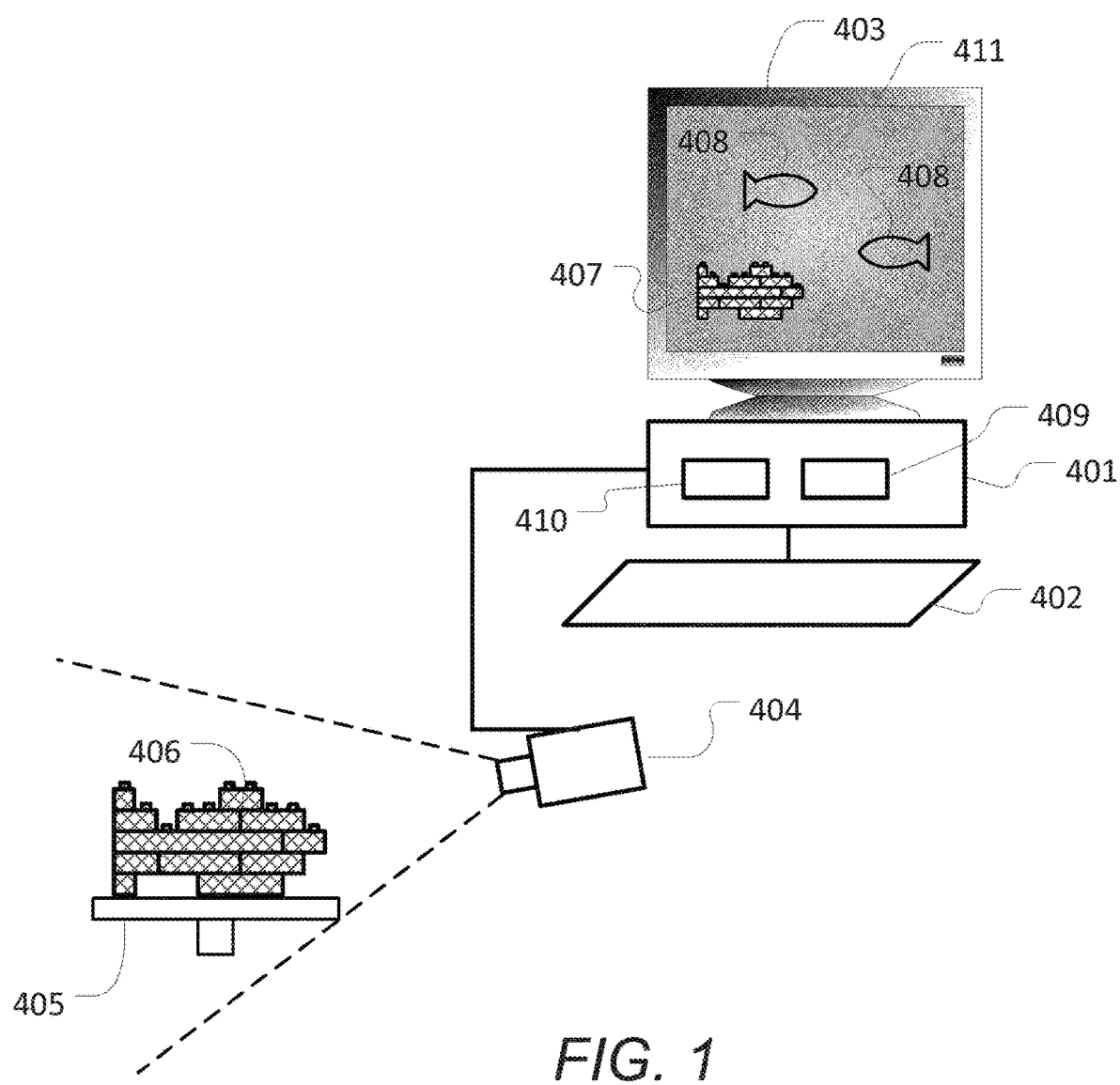
FIG. 1 schematically illustrates an embodiment of a system disclosed herein.

FIG. 1 schematically illustrates an embodiment of a system for creating a digital 3D representation of a physical object. The system comprises a computer 401, an input device 402, a display 403, a camera 404, a turntable 405, and a toy construction model 406 constructed from at least one toy construction element.

The computer 401 may be a personal computer, a desktop computer, a laptop computer, a handheld computer such as a tablet computer, a smartphone or the like, a game console, a handheld entertainment device, or any other suitably programmable computer. The computer 401 comprises a processor 409 such as a Central Processing Unit (CPU) and one or more storage devices such as a memory, a hard disk, and/or the like.

The display 403 is operatively coupled to the computer 401 and the computer 401 is configured to present a graphical representation of a virtual environment 411 on the display 403. Though illustrated as separate functional blocks in FIG. 1, it will be appreciated that the display may be integrated in the housing of the computer.

The input device 402 is operatively coupled to the computer 401 and is configured to receive user inputs. For example, the input device may comprise a keyboard, a mouse, or other pointing device, and/or the like. In some embodiments, the system comprises more than one input device. In some embodiments an input device may be integrated in the computer and/or the display, e.g. in the form of a touch screen. It will be appreciated that the system may comprise further peripheral computer devices operatively coupled to, such as integrated into, the computer.

The camera 404 is operable to capture images of the toy construction model 406 and to forward the captured images to the computer 401. To this end, a user may position the toy construction model 406 on a turntable 405. In some embodiments, the user may construct the toy construction model on top of a base plate. The camera may be a digital camera operable to take digital images, e.g. in the form of a two-dimensional array of pixels. In particular, the camera may be configured to capture light intensities for each pixel and, optionally, additional information such as polarisation information and/or a direction of a surface normal for each pixel or for groups of pixels. Alternatively other types of image capturing devices may be used. In other embodiments, the user may position the object on an object support, e.g. a table and move the camera so as to capture images of the object from different viewpoints.

The display 403, the camera 404 and the input device 402 may be operationally coupled to the computer in a variety of ways. For example one or more of the above devices may be coupled to the computer via a suitable wired or wireless input interface of the computer 401, e.g. via a serial or parallel port of the computer such as a USB port, via Bluetooth, Wifi or another suitable wireless communications interface. Alternative, one or all of the devices may be integrated into the computer. For example, the computer may comprise an integrated display and/or input device and/or an integrated camera. In particular, many tablet computers and smartphones comprise an integrated camera, an integrated touch screen operable as a display and input device.

The computer 401 has stored thereon a program, e.g. an App or other software application, adapted to process captured images and to create virtual 3D objects as described herein. Generally, in an initial step, the process receives a plurality of digital images of a physical object, e.g. of a toy construction model, that have been captured from respective angular positions of the turntable or otherwise from respective viewpoints.

In subsequent steps, the process constructs a 3D digital representation of the toy construction model from the digital images. To this end, the process may perform one or more image processing steps known per se in the art of digital image processing. For example the processing may comprise one or more of the following steps: background detection, edge detection, colour calibration, colour detection. Examples of such a process will be described in greater detail below. The software application may further simulate a virtual environment and control the created virtual 3D object within the virtual environment.

It will be appreciated that, in some embodiments, the computer 401 may be communicatively connected to a host system, e.g. via the Internet or another suitable computer network. At least a part of the processing described herein may then be performed by the host system. For example, in some embodiments, a host system may generate and simulate a virtual environment, such as a virtual world which may be accessible by multiple users from respective client computers. A user may use a client computer executing a suitable program to capture an image. The captured image may be processed by the client computer or uploaded to the host system for processing and creation of a corresponding virtual object. The host system may then add the virtual object to the virtual world and control the virtual object within the virtual world as described herein.

In the example, of FIG. 1, the virtual environment 411 is an underwater environment such as a virtual aquarium or other underwater environment. The virtual objects 407, 408 resemble fish or other underwater animals or creatures. In particular, the computer has created one virtual object 407 based on the captured images of the toy construction model 406. The computer has created the virtual object 407 so as to resemble the toy construction model, e.g. by creating a 3D mesh or another suitable form of representation. In the example of FIG. 1, the virtual object 407 resembles the shape and colour of the toy construction model 406. In the present example, the virtual object even resembles the individual toy construction elements from which the toy construction model 406 has been constructed. It will be appreciated, however, that different levels of resemblance may be implemented. For example, in some embodiments, the virtual object may be created so as to resemble only the overall shape of the construction model without simulating its internal structure of individual toy construction elements. The virtual object may also be created to have a size corresponding to the size of the virtual construction element, e.g. by providing a reference length scale on the turntable 405 so as to allow the computer to determine the actual size of the toy construction model. Alternatively, the computer may use the size of the toy construction elements as a reference length scale. In yet alternative embodiments, the user may manually scale the size of the virtual object. In yet other embodiments, the reconstructed virtual object may be used in software applications other than applications involving a virtual environment.

FIGS. 2-7 illustrate examples of a process for creating a representation of a surface of physical object in 3D space and of various sub-processes of such a process. The embodiments described herein may then be used to create a virtual object or character. For example, the different examples of the process and its sub-processes may be performed by the system of FIG. 1.

Figure 2:
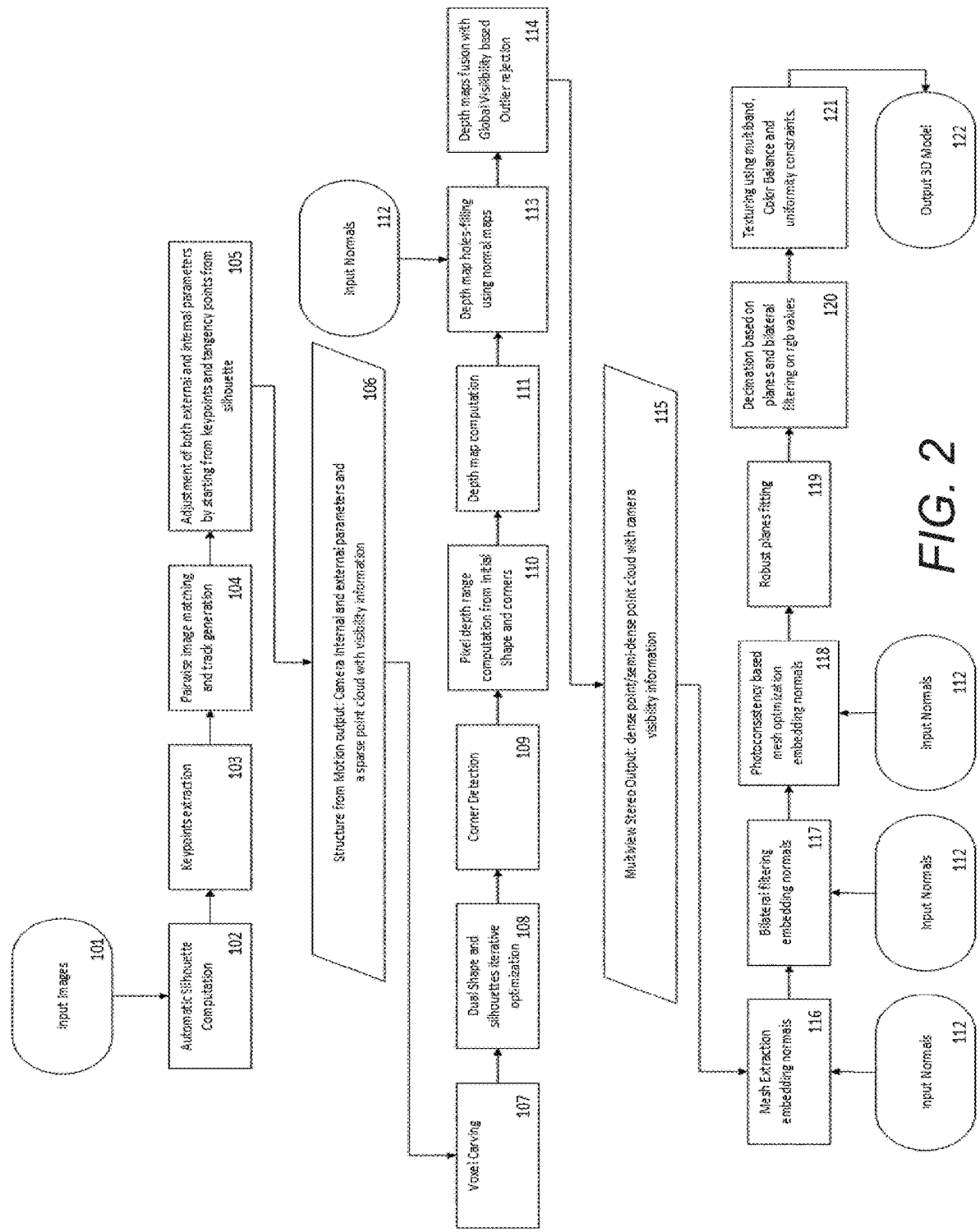
FIG. 2 shows a flow diagram of an example of a method for creating a digital representation in 3D space of an object surface of a physical object. In particular.

In particular, FIG. 2 shows a flow diagram illustrating an example of the overall reconstruction pipeline. Starting from a plurality of images, the process recovers the 3D shape of an object by means of a 3D textured model.

The volume of the object may be regarded as the locus of all points that are present (visible) from all projections at the same time. The surface of this object will be all the points that are neighbours to a non-object point (i.e. empty space).

Acquiring the surface of the object (and converting it to points or triangles) is preferable for applications involving computer graphics (games or cgi) as it is a much tighter (in terms of memory space) representation of the object and fits well with traditional 3D pipelines.

The process is performed by a computing device, e.g. as described in FIG. 1. Generally, the computing device may be a suitably programmed computer. In some embodiments, the processing can be made on a server and the result returned back to a client device after the computation.

In particular, at initial step 101, the process receives a plurality of digital images of a physical object, e.g. of a toy construction model, from respective view points. For example, the process may receive as an input a collection of 2D images (e.g. opacity maps of an object acquired through segmentation, against the background with original RGB images) as well as all associated model view projection matrices for all cameras used to acquire the images. Although input images can be fed to the pipeline from any type of camera, for the purpose of the present description, it is assumed that every image is accompanied by a corresponding normal map. The creation of the normal map may be performed by the camera(s) that has/have captured the images or by the processing device, e.g. as a pre-processing step preceding the reconstruction pipeline. To this end, various methods for extracting normal maps can be used and the reconstruction pipeline described herein is independent of the particular method for creating a normal map, preferably for creating a normal map associated with each input image. As a non-limiting example, the normal map can be generated by photometric stereo algorithms as in (Woodham, 1979) and (Barsky & Petrou, 2003), where multiple lighting settings are obtained with different light view points from specifically mounted LEDs on the acquisition hardware. The lights and the camera sensor can mount polarized filters.

In subsequent step 102, the process computes object silhouettes. Object silhouettes will be used in combination with images in several phases of the reconstruction pipeline. The silhouettes may be extracted with an automatic method or with the method illustrated in FIG. 3 and presented hereafter.

At subsequent step 103, the process extracts feature points from the images, using a suitable feature point extractor, preferably. Preferably, the feature point extractor is scale invariant and has a high repeatability. Several feature point extractors can be used, as example the one presented in U.S. Pat. No. 6,711,293 and (Lindeberg, 1998). A score response can be associated to every extracted keypoint.

Next, at step 104, the process performs pairwise image matching and track generation. The keypoints descriptors previously extracted are matched across the images in a pairwise matching framework. Corresponding keypoints across the images are associated to a track. To this end, different methods can be used, for example, but not limited to, the one described in (Toldo, Gherardi, Farenzena, & Fusiello, 2015).

At subsequent step 105, starting from a known initial estimation, internal and external camera parameters are adjusted starting from the previously generated tracks. For example, a bundle adjustment process may be employed to jointly recover the tracks' 3D positions and the cameras' internal and external parameters, e.g. as described in (Triggs, McLauchlan, Hartley, & Fitzgibbon, 1999).

Optionally, at subsequent step 106, the process may display a first intermediate output, e.g. the cameras' internals and externals as well as a sparse point cloud with visibility information.

Next, at step 107, the process performs voxel carving. This shape from silhouette step allows to generate a voxel grid by projecting the previously computed silhouettes into 3D space, e.g. as detailed in (Laurentini, 1994). For convenience, the voxels may be converted to a 3D dense point cloud.

At subsequent step 108, the process performs a dual shape and silhouette iterative optimization. During this step, the previously computed silhouettes are optimized by re-projecting the volume from the space carving onto the images and by embedding the pixel/superpixel matching information into a global optimization framework. An example of this sub-process will be described in greater detail below and with reference to FIG. 7.

Next, at step 109, the process performs corner detection. Corners are extracted and used to improve the overall geometry of the reconstructed object. To this end, several corner extractors can be used, for example (Canny, 1986) or (Harris & Stephens, 1988). The extracted corners are matched in the different images and the generated 3D points are used to integrate the original point cloud and to carve out the inconsistent points, e.g. the concave parts of the mesh resulting from the voxel carving approach.

At step 110, the process performs pixel depth range computation using the results from steps 108 and 109. During this step, the initial volume from the voxel carving step is used to restrict the depth range search for each pixel during the depth map initialization.

At step 111 the process performs the actual depth map computation. To this end corners and cross-correlation are used to define initial depth map candidates. For each pixel zero or one 'candidate depth' can be defined. Several algorithms and several correlation methods can be used in order to generate the depth maps, see e.g. (Seitz, Curless, Diebel, Scharstein, & Szeliski, 2006). This step thus creates an intermediate representation in the form of a depth map.

At step 112, the previously computed normals are processed and fed to the next step (step 113). Normal maps can be computed by using any suitable method for computing normal maps known as such in the art, including, but not limited to, photometric stereo algorithms. As illustrated in FIG. 2, the computed normals from step 112 are used at different stages of the pipeline.

Figure 4:
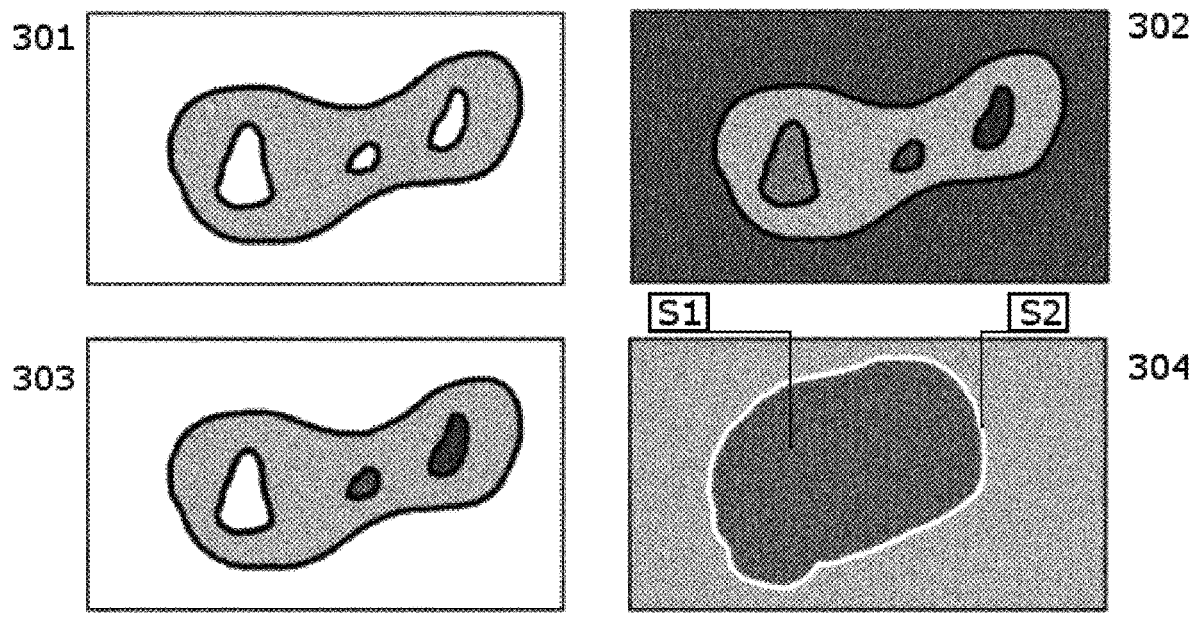
FIG. 4 illustrates a depth map hole filling sub-process.

Next, at step 113, the process performs depth map hole filling using the normal maps. Depth maps can contain several holes, especially in completely untextured areas due to poor matching. In order to overcome this problem, a hole in the depth map can be filled, if it is a closed hole, if the border pixels indicate a uniform planar surface and if the normal data confirms the above two findings. Hence, in this step, an intermediate representation in the form of a depth map is modified so as to create a modified intermediate representation in the form of a modified depth map where some or all of the holes in the previous depth map have been filed. An example of this process is illustrated in FIG. 4 and will be presented hereafter.

At step 114, the process performs depth maps fusion into the 3D space with a global visibility based outlier rejection. Outlier points may be rejecting by checking the visibility constraint, i.e. they must not occlude other visible points. Several procedures can be used to enforce the visibility constraint, see e.g. (Seitz, Curless, Diebel, Scharstein, & Szeliski, 2006) (Furukawa, Curless, Seitz, & Szeliski, 2010).

At step 115, the process may optionally produce a second intermediate output of this pipeline, namely a multi view stereo output composed by a dense point cloud and visibility information.

Next, at step 116, the process performs mesh extraction. A mesh can be extracted using any known approach such as the one solving the Poisson equation (Kazhdan, Bolitho, & Hoppe, 2006) or Delaunay based algorithms (Seitz, Curless, Diebel, Scharstein, & Szeliski, 2006). The normals previously computed at block 112 can be used as additional input, for example directly in the Poisson equation. The mesh may be a triangle mesh or another type of polygon mesh. The mesh comprises a set of triangles (or other types of polygons) that are connected by their common edges or corners. The corners are referred to as vertices of the mesh which are defines in 3D space. Hence, this sub-process creates an intermediate representation in the form of a preliminary/intermediate surface mesh.

Figure 5:
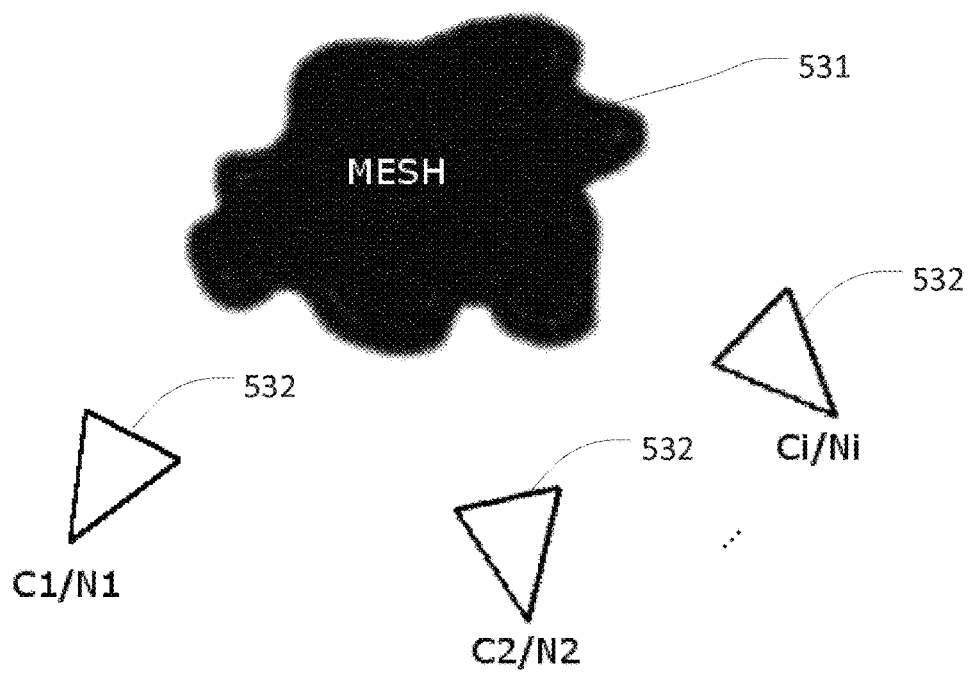
FIG. 5 illustrates a bilateral filtering sub-process.

Next, at step 117, the process performs bilateral filtering using normals. Like step 116, the normals maps computed at block 112 are used as additional input. The bilateral filtering step moves the positions of the mesh vertices in order to maximize the normals' consistency leading to less noise and sharper edges. This step brings the mesh closer to a global minimum before running the subsequent photoconsistency based mesh optimization. An example of the bilateral filtering approach is illustrated in FIG. 5 and will be presented hereafter.

Next, at step 118, the process performs a photoconsistency based mesh optimization using normals. Like the previous two steps, the same normals computed at block 112 are used as an additional input. An example of the photoconsistency based mesh optimization is illustrated in FIG. 6 and will be presented hereafter. Hence, this step creates a modified intermediate representation (in the form of a modified mesh) from a previous intermediate representation (in the form of a previous mesh).

At step 119, the process performs robust plane fitting: Planar regions are detected from the 3D model. Planar regions can be used to improve the subsequent decimation, for object recognition and the final quality of the mesh. Several planar region algorithms can be used, including but not limited to (Toldo & Fusiello, Robust multiple structures estimation with j-linkage, 2008) and (Toldo & Fusiello, Photo-consistent planar patches from unstructured cloud of points, 2010).

At step 120, the process performs mesh decimation. This can be either based on the extracted planes or simply geometric (Garland & Heckbert, 1997) after the points has been projected on the corresponding plane.

At step 121, the process performs texturing using multi-band, color balance and uniformity constraints. The texture can be generated using a multiband approach (Allene, Pons, & Keriven, Seamless image-based texture atlases using multi-band blending, 2008); by dividing low and high frequencies, it is possible to be more robust to lighting changes (multiband) as well as color balancing the color changes globally. Moreover, given the nature of the reconstructed objects, it is possible to set certain uniformity constraints.

Finally, at step 122, the process outputs the final output of the reconstruction pipeline, namely a simplified 3D mesh complete with normals and textures.

It will be appreciated that alternative embodiments of a reconstruction pipeline may modify or even omit one or more of the above steps, change the order of some of the steps, and/or replace one or more of the above steps by other steps.

Optionally, once a 3D representation of the physical object has been created, e.g. by the above pipeline, the process may determine one or more visual attributes of the detected toy construction model, e.g. an aspect ratio of the detected shape, a dominant colour, and/or the like.

In a subsequent step, the process may create a virtual object based on the reconstructed 3D digital representation. If movement of the virtual object is to be animated in the virtual environment, the process may further create a skeleton matching the created 3D representation.

Optionally, the process sets the values of one or more virtual attributes associated with the virtual object. The process sets the values based on the detected visual attributes. For example:
 the process may set a maximum speed parameter based on the aspect ratio: max_speed=F(aspect ratio);
 the process may set a food type of the virtual object based on the detected colour, e.g.
  Case (colour)
   (red): food type=meat;
   (green): Food type=plants;
   (else): Food type=all.
 The process may set the required daily calorie intake of a virtual character based on the detected size of the toy construction model.

In a subsequent step, the process may add the virtual object to the virtual environment and control evolution of the virtual environment including the behaviour of the virtual object. To this end, the process may execute a control process which implements a control system for controlling a virtual object in a virtual environment.

Figure 3:
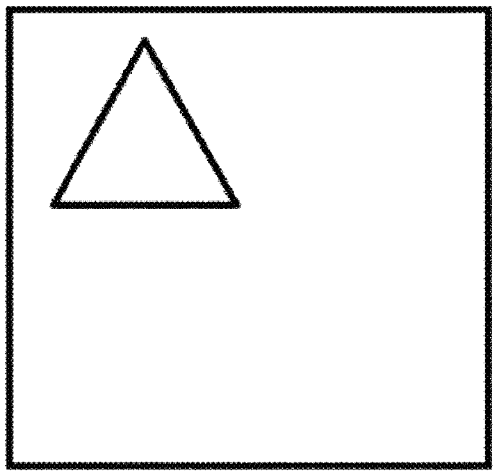
FIG. 3 illustrates steps of an automatic silhouette generation sub-process.
Figure 3:
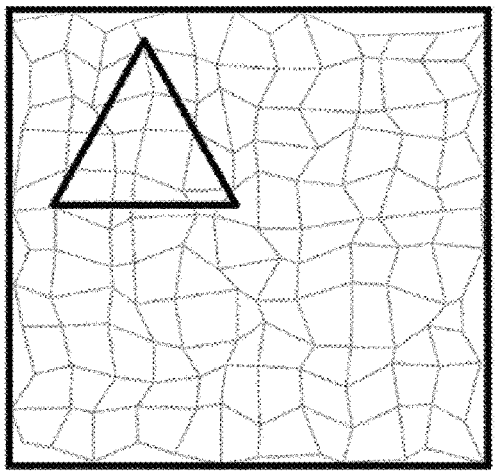
Figure 3:
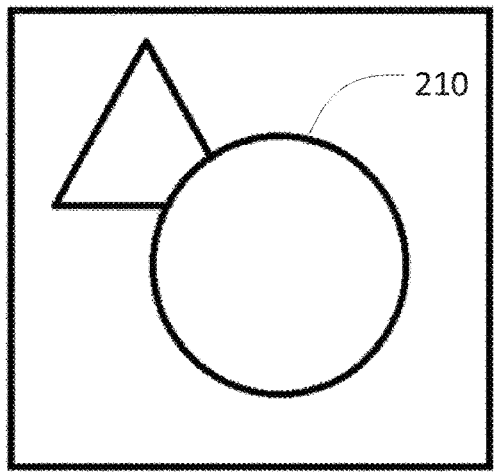
Figure 3:
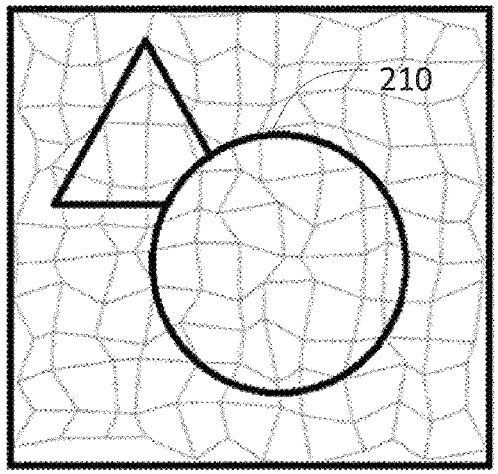
Figure 3:
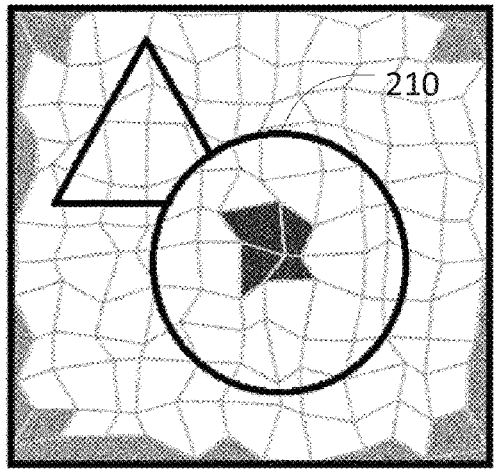
Figure 3:
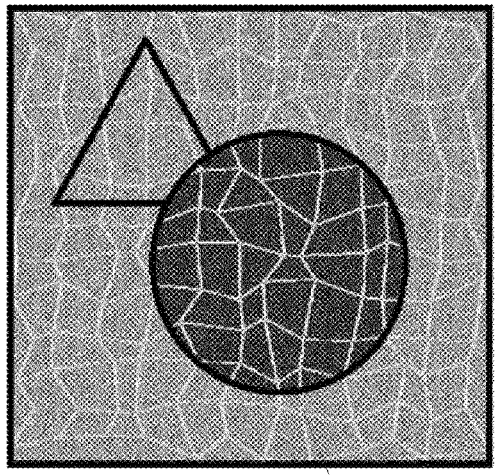

FIG. 3 illustrates steps of an automatic silhouette generation sub-process. In one embodiment, the silhouette of the object to be reconstructed is extracted automatically for each image through a background and foreground segmentation algorithm. To this end, it is assumed that some pre-existing knowledge of the physical setup is available, e.g. in the form of a background image and information about the rough positioning of the object in the image space. From the rough knowledge of the object positioning a probability map P can be extracted for each pixel. The probability map function P(x,y) outputs the probability value of a pixel belonging to the object and its value ranges from 0 to 1, where a value of 0 means that the pixel belongs with certainty to the background and a value of 1 means that the pixel belongs with certainty to the object. Segmentation is done by firstly generating superpixels. Several methods can be used to extract superpixels, for example the one described in (Achanta, et al., 2012). Each superpixel is associated to a set of pixels. Each superpixel value can be associeted with values coming from the set of belonging pixels. The mean or the median value can be used. The segmentation may be done at the superpixel level and then transferred to the pixel level.

The original RGB images can be converted to LAB color space for improving the correlation functions and the superpixels extraction.

In the first part of the algorithm, a set of superpixel seeds are detected. The seeds are marked either as foreground or background and they represent superpixels with a high probability of belonging to the foreground or the background. More in detail, for a superpixel i, the score S can be computed as follows $$S(i)=P(i)*dist(i,back(i))$$

Where dist is a distance function between two superpixels (as for example an Euclidean distance between the superpixels' median value in LAB color space), and back is a function that associated a superpixel i to a corresponding superpixel on the background object. If S is below a fixed threshold T1 then the superpixel i is associated to the background seeds, else if S is above a fixed threshold T2 then the superpixel i is associated to the foreground seeds. Adaptive thresholds could be used as an alternative, for example by computing the scene lighting.

The seeds superpixel are then grown using a region growing approach. In particular, for each superpixel j close to a foreground or a background superpixel s, a distance d with the function dist(j, s) is computed. The superpixel having the minimum distance among all the superpixels, is associated either to foreground or background superpixel set and the process is iterated until all the superpixels belong to the foreground or the background sets.

Image 201 shows an example of a plain background image, i.e. an image of the scene into which the physical object will be placed for the purpose of capturing images of a the a physical object. Image 202 illustrates an example of a segmentation of the background image into superpixels, e.g. using a plain superpixel approach.

Image 203 shows a picture of a physical object 210 placed in front of the background. The image 203 may represent one of multiple views of the physical object which is used as an input to the pipeline. Image 204 illustrates an example of a segmentation of image 203 into superpixels, e.g. using a plain superpixel approach.

Image 205 illustrates the initial seeds, which are computed using the approach explained above. The foreground (i.e. object) seeds are illustrated in black while the background seeds are illustrated in gray. Image 206 shows the background (gray) and the foreground (black) grown into the final mask, which may be further improved by the process described with reference to step 108 of FIG. 2.

FIG. 4 illustrates a depth map hole filling sub-process. In particular, image 310 schematically illustrates an example of a depth map, e.g. as created from step 111 of the process of FIG. 2. Image 301 illustrates areas with valid depth data in gray and areas with missing (or too sparse or unreliable) depth data as white areas. Since the initial depth map has valid values and missing data, the process initially the connected regions of the depth map which have missing data. The various candidate connected regions are illustrated by different shades of gray in image 302. For each connected candidate region, the process computes the area of the candidate region. The process then discards regions having an area larger than a predetermined threshold. The remaining candidate regions are illustrated in image 303 while image 4 schematically illustrates on of the remaining candidate regions.

For every remaining connected candidate region and based on the normal map, the process computes the following quantities and uses the computed quantities to select whether the candidate region represents a hole that is to be filled, e.g. by comparing the respective quantities to respective threshold values and determining that a region is a hole to be filled only if the quantities fulfil a predetermined selection criterion (e.g. only if all quantities exceed the respective threshold values):

A first similarity value of normals that fall inside the connected region (S1); a high similarity value indicates a region that is similar to a plane surface. Selecting a region based on the first similarity value allows the process to control the type of holes that will be filled: filling only regions having a high first similarity value will result in only regions that are very uniform to be filled, while filling regions having a small first similarity value results in complex regions to be filled (although this may introduce some approximation error during the filling phase).

A second similarity value of normals that fall onto the periphery (S2) of the connected region. Considering the second similarity value allows the process to distinguish between the following possible scenarios: a connected region of missing depth data may be indicative of a hole that really exists in the physical object or it may be indicative of unreliable missing data in the depth map that does not represent a real hole in the object.

In order to correctly distinguish between these scenarios, the process further determines the compatibility between normals that fall inside the region (S1) and normals that fall near or on its border (S2). A low compatibility value indicates that the hole and its border belong to two different surfaces (of the same object or of the object with regards to the background) which, in turn, means that the region does not need to be filled. A high compatibility value indicates that the candidate region represents a region of missing data that needs to be filled.

If the first and second similarity values are above respective thresholds and if the compatible value is above a certain threshold, then the connected region is determined to represent a hole in the depth map that is to be filled. Each of the similarity values may be defined in a number of ways. For example, in many situations it may be reasonable to assume that the holes to be filled are a part of a region that is at least to some extent planar. In such situations, the the normals inside the hole and along the border would be pointing in the same direction. The similarity values can thus be computed by using the dot product or angle distance among the normals. For example, the similarity value may be computed by determining the mean normal within the region in questions (S1 and S2, respectively) and by computing the distance of each normal wrt to the computed mean normal. If the distance d between the majority of the normals and the mean normal are below a certain threshold (or −d is above a certain threshold), then the region is determined to be planar. The compatibility value may be determined from the distance between the mean normal of region S1 and the mean normal of region S2 where a large distance corresponds to a low compatibility value.

The process then fills the remaining candidate regions that have not been discarded and have been determined to represent holes that are to be filled. Depth map filling can be done, for example, by interpolating between the depth values on or near the border of the connected region to be filled. Other, more sophisticated filling methods may be based on a global analysis of the border so that the filling process can be more uniform (e.g. using plane fitting). A global approach may also be used, based on a priority function so that, on every iteration, the process re-evaluates which pixel is going to be filled and how.

FIG. 5 illustrates a bilateral filtering sub-process. The bilateral filtering process receives as inputs a preliminary mesh 531 representing the object to be reconstructed, e.g. the mesh computed in step 116 of the process of FIG. 2. The bilateral filtering step further receives information of the plurality of n (n>1) cameras and a normal map associated with each camera, schematically designated by triangles 532 in FIG. 5. The camera information includes information the camera parameters including the camera viewpoint, e.g. as provided by step 106 of the process of FIG. 2. The normal maps may be the normal maps provided by step 112 of FIG. 2, optionally further refined by the hole filling process of step 113 of FIG. 2. The n pairs of cameras and normals will be denoted by (Camera1/Normals1 (C1/N1), Camera2/Normals2 (C2/N2), . . . , Camera i/Normal i (Ci/Ni)). The bilateral filtering step is an iterative algorithm comprising the following four steps which are repeated a certain number of iterations (e.g. a predetermined number of iterations or based on a suitable topping criterion):

Step 1: Initially the process computes the area and barycentre of each triangle of the mesh.

Step 2: Subsequently, for each triangle, the process determines whether the triangle is visible. To this end, the process may use any suitable method for visibility computation known as such in the art of computer graphics, e.g. the method described by (Katz, Tal, & Basri, 2007).

Step 3: Subsequently, using the normal maps associated with the camera, the process computes an estimated surface normal for each triangle, e.g. by performing the following steps:

The barycentre of the triangle is projected onto all the normal maps that see the currently examined triangle. The output of this sub-step is a list of normals (L)

The average of the thus determined normals (L) is computed, optionally considering a weight associated with each normal (e.g. a confidence value indicative of the confidence of the normal coming from the photometric stereo approach).

The normal in the list (L) which is closest to the computed average, is the new normal for the currently examined triangle.

Hence, this step results in each triangle having two normal associated with them: i) The normal defined by the triangle, i.e. the direction normal to the plane of the triangle and ii) the estimated surface normal determined from the normal maps by the above process. While the first normal defines the orientation of the triangle, the second normal is indicative of the estimated surface orientation of the physical object at the location of the triangle.

When the process selects the normal from one of the normal maps that is closest to the average normal, which is computed using all the normals that are associated to the 3D point under consideration, the process assigns an individual normal value to the 3D point instead of an averaged one. This has been found to prevent over-smoothing and to better preserve sharp edges, while also being robust during the selection.

Step 4: Subsequently, the process computes new estimated vertex positions.

The goal of this sub-step is to move the vertices of the mesh such that the new vertex positions at least approximately minimize the differences between the normals associated with the 3D model's triangles and the normals that are estimated based on the normal maps.

This sub-step is iterative and is described by the following formula that is applied to each iteration:

$$v'_i = v_i + \frac{\sum_{j \in N(v_i)} A_j n_j (n_j \cdot (c_j - v_i))}{\sum_{j \in N(v_i)} A_j}$$

Where:
$V_i$ is the old vertex position
$V'_i$ is the new vertex position
$c_j$ is the centroid of the j-th triangle
$n_j$ is the normal derived from the normal map in respect of the centroid of the j-th triangle
$N(v_i)$ is the 1-ring neighborhood of $v_i$, i.e. the set of all triangles of the mesh that have vertex $v_i$ as a corner (alternatively a larger neighbourhood kan be used).
$A_j$ is the area of the j-th triangle Hence, the vertex vi is moved such that the normals associated with the triangles to which the vertex belongs more accurately correspond to the corresponding normals that are derived from the normal maps. The contribution from each triangle is weighted by the surface area of the triangles, i.e. large triangles are weighted more than small triangles. The movement of $v_i$ is thus is restrained by the mesh topology, i.e. determined by the local properties of the mesh in a neighbourhood of the vertex. In particular, the movement of vi is restrained by the areas of the triangles surrounding the vertex.

Figure 6A:
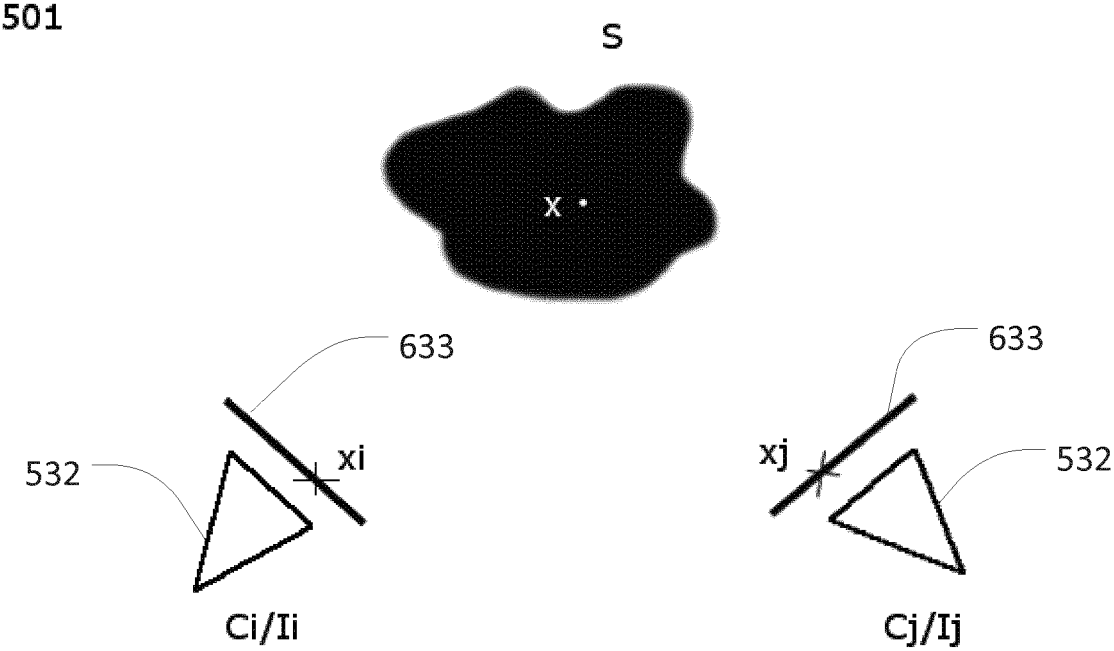
FIGS. 6A-C illustrate a photoconsistency mesh optimization process that uses normals data.
Figure 6B:
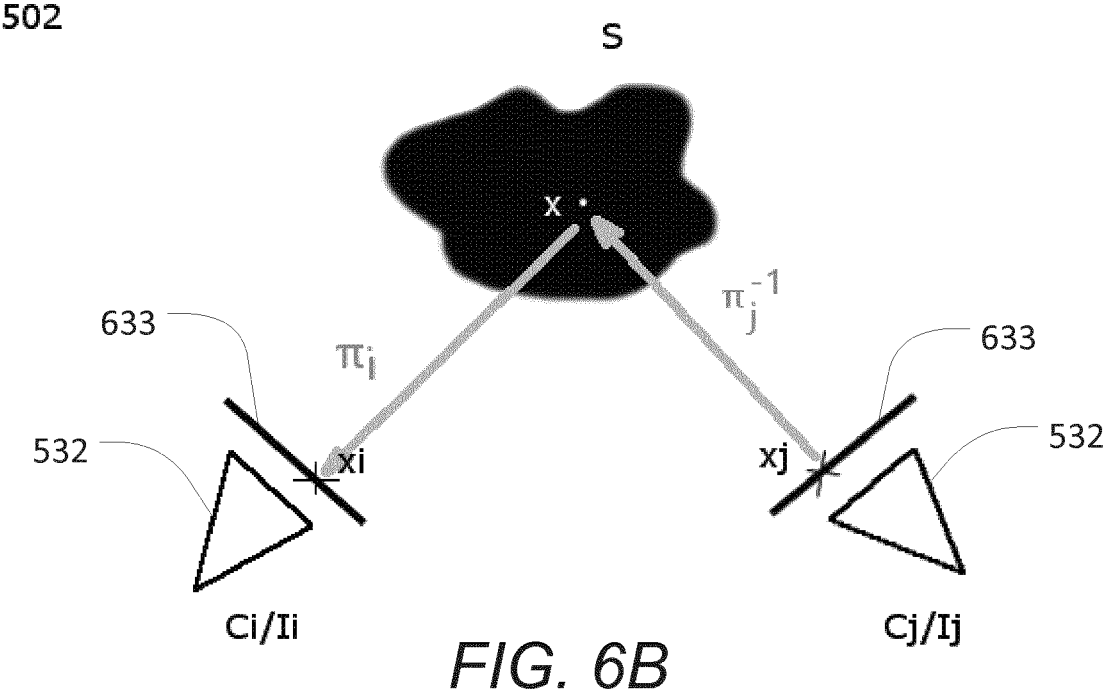
Figure 6C:
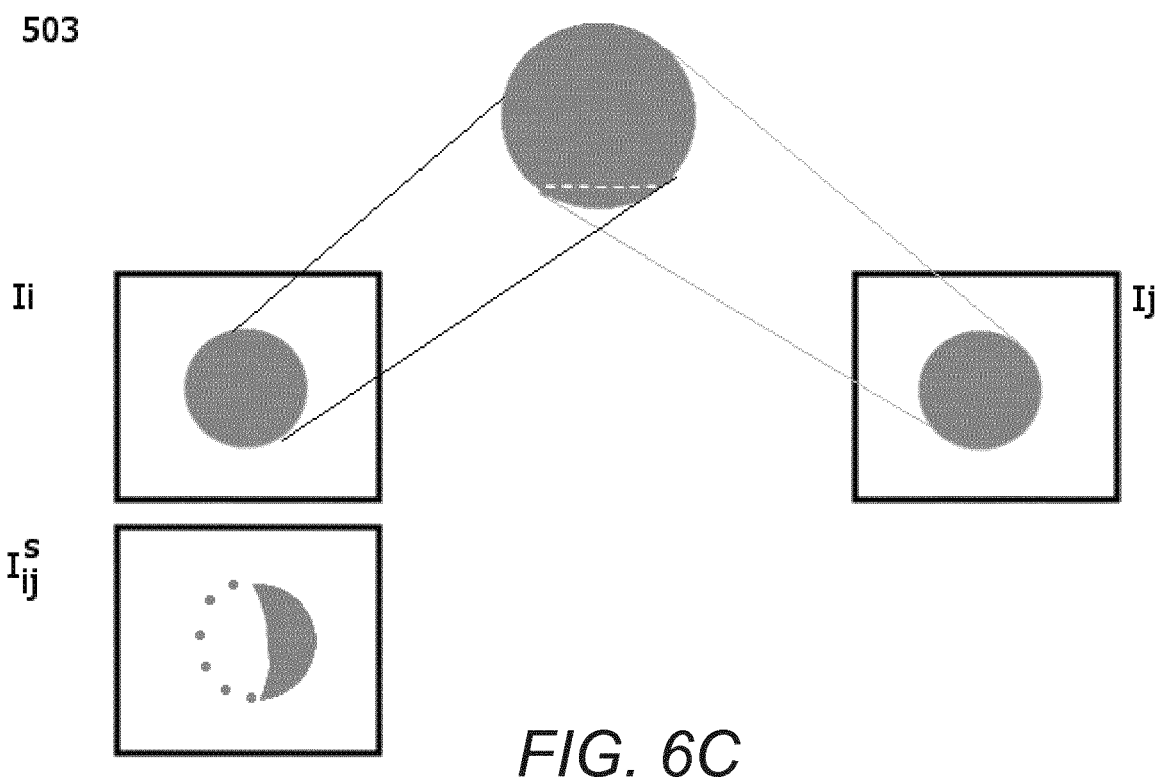

FIGS. 6A-C illustrate a photoconsistency mesh optimization process that uses normals data. As the initial surface reconstruction method is interpolatory and since the point cloud may contain a decent amount of noise, the obtained initial mesh, noted as $S_0$, is normally noisy and may fail to capture fine details. By using all the image data, this mesh is refined with a variational multiview stereovision approach: $S_0$ is used as the initial condition of a gradient descent of an adequate energy functional. As the mesh $S_0$ is already close to the desired solution—in particular when $S_0$ is the result of the bilateral filtering step described above—this local optimization is very unlikely to get trapped in an irrelevant local minimum. Prior art mesh optimization techniques based on photoconsistency have been presented on several works, including, but not limited to (Faugeras & Keriven, 2002), (Vu, Labatut, Pons, & Keriven, 2012), (Vu, Labatut, Pons, & Keriven, 2012). In the following an improved photoconsistency process will be described that further incorporates the data representing the normal maps, e.g. as provided by step 112 of FIG. 2 and, optionally, further refined by step 113 of FIG. 2.

FIG. 6A shows a simple example of a certain surface S and a point x on S. For every camera position, the projection of x in the image 633 captured by the camera is computed. In FIG. 6A two camera positions 532 and the corresponding images 633 are shown, but it will be appreciated that embodiments of the process described herein will normally involve more than two camera positions.

$C_i$ is the camera i and $C_j$ is the camera j. Every camera has a corresponding image 633, in this example $I_i$ denotes the image captured by $C_i$ and $I_j$ is the image capture by $C_j$. Similarly, if $\Pi$ denotes the projection of point x in an image, then $x_i = \Pi_i(x)$ is the projection of x in $I_i$ and $x_j = \Pi_j(x)$ is the projection of x in $I_j$.

FIG. 6B illustrates an example of an image reprojection: Each valid pixel $x_j$ in image $I_j$ may be expressed as $$x_j \xrightarrow{\Pi_j^{-1}} x$$

Moreover, if x is visible from camera position $C_i$, the following also holds:

$$x \xrightarrow{\Pi_i} x_i$$

The result, $I_{ij}^S$ is the reprojection of $I_j$ in $C_j$ induced by surface S.

As shown in FIG. 6C, this means that if a pixel in $I_j$ is not reprojected correcly (induced by S) into $I_i$ that pixel is simply discarded for the purpose of defining the reprojection.

In order to proceed with the algorithm, some similarity measure is defined: As an example, cross correlation, mutual information or similarity using normals can be used as suitable similarity measures. Whichever is the chosen similarity measure, nearby cameras may in some scenarios have to be selected in a suitable way, e.g. in situations where neighboring cameras do not view similar regions of an object.

The local measure of similarity between $I_i$ and $I_{ij}^S$ at $x_i$ is defined as $$h(I_i, I_{ij}^S, x_i)$$

The overall measure of similarity between $I_i$ and $I_{ij}^S$ is then defined as $$M_{ij}(S) = M(I_i, I_{ij}^S) = \int_{\Omega_{ij}^S} h(I_i, I_{ij}^S, x_i) dx_i$$

where the domain of definition of $I_{ij}^S$ is $\Pi_{ij}^S$

Based on this measure of similarity, the following energy functional may be defined:

$$E(S) = \prod_P M_{ij}(S)$$

Where P is a set of pairs of camera positions ($C_i$, $C_j$), chosen between neighboring cameras positions.

For the purpose of the present description we use the Gâteaux derivative of E to define the rate of variation of the energy E when the surface S undergoes a deformation along a vector field v:

$$dE(S; v) = \lim_{\varepsilon \to 0} \frac{E(S + \varepsilon v) - E(S)}{\varepsilon} = \frac{d}{d\varepsilon} E(S + \varepsilon v) \bigg|_{\varepsilon=0}$$

Shape motion via functional minimization can be performed by evolving the surface S in the direction of the negative derivative to best reduce the energy E.

In the following, it will be described how the computation of a similarity measure can be modified by incorporating the normal maps.

Given two normal maps, the measure that allows establishment of a degree of similarity between a point belonging to the first normal map and a point belonging to the second normal map has to be defined. A variety of functions can be used for this purpose. In the following, as an example, the cross correlation usage applied to normals is described.

In the following, for the sake of ease of description, it is assumed that normal maps are available for all the images, i.e. for each camera position, and that the normal maps have been transformed into world space coordinates. If the normal acquisition method outputs normal maps in camera space, a conversion may thus need to be performed before processing.

Instead of the images $I_i$ and $I_{ij}^S$ at $x_i$, now we consider the normal maps $N_i$ and $N_{ij}^S$ at $x_i$.

For convenience, we denote $N_1 = N_{1i}$, $N_2 = N_{ij}^S$ and we drop the index i of $x_i$.

The similarity measure is defined as $$h(N_1, N_2, x) = s(x) = \frac{v_{1,2}(x)}{\sqrt{v_1(x) \cdot v_2(x)}}$$

where covariance, mean and variance, respectively, may be expressed as follows:

$$v_{1,2}(x) = K^*(N_1(x) \cdot N_2(x)) - \mu_1(x) \cdot \mu_2(x)$$

$$\mu_r(x) = K^* N_r(x) \text{ with } r=1,$$

$$v_r(x) = K^* N_r^2(x) - \mu_r^2(x) \text{ with } r=1,2$$

where K is a suitable convolution kernel (e.g., Gaussian kernel, average kernel, or the like).

The Gâteaux derivative of E requires the derivative of the similarity measure with respect to the normal map $N_2$. In this case, this derivative may be computed as follows:

$$ds(x) = \frac{D_2[v_{1,2}(x)] \cdot \sqrt{v_1(x) \cdot v_2(x)} - v_{1,2}(x) \cdot D_2\left[\sqrt{v_1(x) \cdot v_2(x)}\right]}{v_1(x) \cdot v_2(x)}$$

$$= \frac{D_2[v_{1,2}(x)]}{\sqrt{v_1(x) \cdot v_2(x)}} - \frac{v_{1,2}(x) \cdot D_2\left[\sqrt{v_1(x) \cdot v_2(x)}\right]}{v_1(x) \cdot v_2(x)}$$

where $$D_2[v_{1,2}(x)] = N_1(x) - \mu_1(x)$$

$$D_2\left[\sqrt{v_1(x) \cdot v_2(x)}\right] = \frac{D_2[v_1(x) \cdot v_2(x)]}{2 \cdot \sqrt{v_1(x) \cdot v_2(x)}}$$

$$= \frac{v_1(x) \cdot D_2[v_2(x)]}{2 \cdot \sqrt{v_1(x) \cdot v_2(x)}}$$

$$= \frac{v_1(x) \cdot (2 \cdot N_2(x) - 2 \cdot \mu_2(x))}{2 \cdot \sqrt{v_1(x) \cdot v_2(x)}}$$

$$= \frac{v_1(x) \cdot (N_2(x) - \mu_2(x))}{\sqrt{v_1(x) \cdot v_2(x)}}$$

we finally obtain $$ds(x) = \frac{N_1(x) - \mu_1(x)}{\sqrt{v_1(x) \cdot v_2(x)}} - \frac{v_{1,2}(x) \cdot (N_2(x) - \mu_2(x))}{v_2(x) \cdot \sqrt{v_1(x) \cdot v_2(x)}}$$

$$= \frac{N_1(x) - \mu_1(x)}{\sqrt{v_1(x) \cdot v_2(x)}} - \frac{s(x) \cdot (N_2(x) - \mu_2(x))}{v_2(x)}$$

$$= \frac{N_1(x)}{\sqrt{v_1(x) \cdot v_2(x)}} - \frac{\mu_1(x)}{\sqrt{v_1(x) \cdot v_2(x)}} - \frac{s(x) \cdot N_2(x)}{v_2(x)} +$$

$$\frac{s(x) \cdot \mu_2(x)}{v_2(x)}$$

Hence, the process may perform a gradient descent minimization of an energy functional (with respect to the modelled/reconstructed surface) that is computed from a measure of similarity of normal maps using the above derivatives and the above definition of a similarity measure or another suitable similarity measure.

Figure 7:
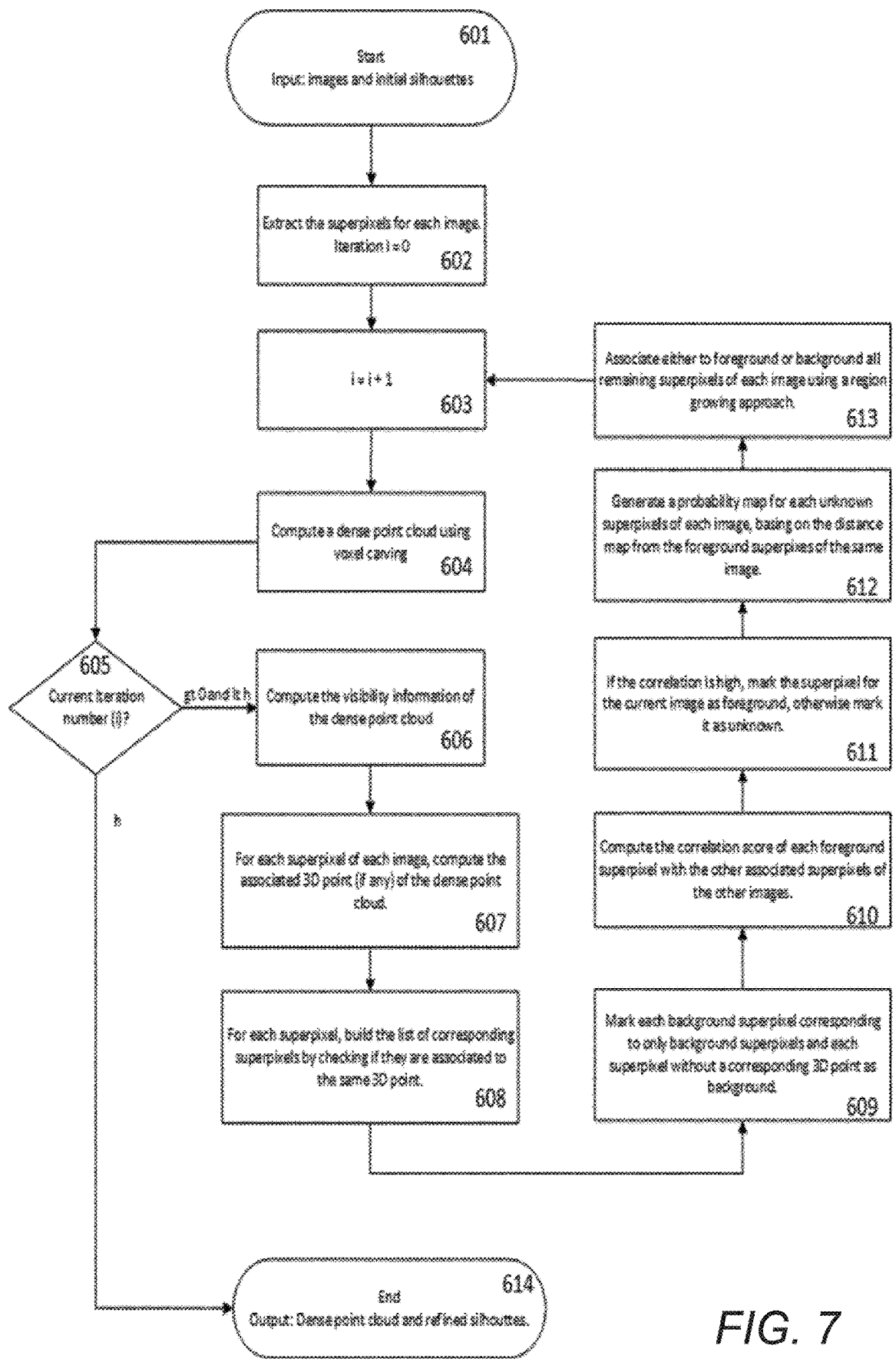
FIG. 7 shows a flow diagram of an example of a dual shape and silhouettes optimization sub-process.

FIG. 7 shows a flow diagram of an example of a dual shape and silhouettes optimization sub-process.

At initial step 601, the process receives silhouettes that have already been extracted during a previous step of a reconstruction pipeline, e.g. during step 102 of the process of FIG. 2.

The process further receives the number of desired iterations (h) as an input, e.g. as a user-defined input. This value may not need to be very high, since when good enough silhouettes are fed to the system simply 2 or 3 iterations may suffice for the process to converge.

At step 602, the process is initialized. In particular, the number of iterations I is set to its initial value, in this case i=0. Also the superpixels for each image are extracted, e.g. as described above with reference to the silhouette extraction. The Iteration count is increased at step 603 and the dense point cloud is computed using voxel carving at block 604, e.g. as described in connection with step 107 of FIG. 2. The steps 603 and 604 are repeated while the current iteration i is greater than 0 and less than h, while this condition is true, which is checked in step 605, the process performs steps 606 through 613 before returning to step 603.

In particular, at step 606, the visibility information of the dense point cloud is computed. Any method for computing the visibility for a point cloud can be used, e.g. (Katz, Tal, & Basri, 2007).

Then, for each superpixel of each image, the associated 3D point (if any) of the dense point cloud is computed at step 607.

Next, at step 608, for each superpixel, the list of corresponding superpixels on the other images is built by checking if they are associated to the same 3D points.

At subsequent step 609, the process marks each background superpixel corresponding to only background superpixels in the other images and each superpixel without a corresponding 3D point as background.

At step 610, a similarity score of each foreground superpixel with the other associated superpixels of the other images is computed. Any correlation function can be used as similarity score. For example the simple Euclidean difference between the median colors of the two superpixels considered.

At step 611, if the correlation computed at step 610 is high (e.g. higher than a predetermined threshold), the process marks the superpixel for the current image as foreground, otherwise the process marks it as unknown.

At step 612, a probability map for each unknown superpixel of each image is generated, based on the distance map from the superpixels already marked as foreground of the considered image.

At step 613, before going back to block 603, all remaining superpixels of each image are associated either to foreground or background using a region growing approach.

When the condition at block 605 is false, i.e. after the desired number of iterations, the process proceeds at block 614 where the process provides the dense point cloud and refined silhouettes as an output.

Embodiments of the method described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

REFERENCES

Achanta, R., Shaji, A., Smith, K., Lucchi, A., Fua, P., & Susstrunk, S. (2012). SLIC superpixels compared to state-of-the-art superpixel methods. *IEEE transactions on pattern analysis and machine intelligence,* 34(11), 2274-2282.

Allene, C., Pons, J., & Keriven, R. (2008). Seamless image-based texture atlases using multi-band blending. *Pattern Recognition,* 2008. ICPR 2008. 19*th International Conference on,* (pp. 1-4).

Allene, C., Pons, J.-P., & Keriven, R. (2008). Seamless image-based texture atlases using multi-band blending. *Pattern Recognition,* 2008. ICPR 2008. 19*th International Conference on,* (pp. 1-4).

Barsky, S., & Petrou, M. (2003). The 4-source photometric stereo technique for three-dimensional surfaces in the presence of highlights and shadows. *IEEE Transactions on Pattern Analysis and Machine Intelligence,* 25(10), 1239-1252.

Canny, J. (1986). A computational approach to edge detection. *IEEE Transactions on pattern analysis and machine intelligence*(6), 679-698.

Crandall, D., Owens, A., Snavely, N., & Huttenlocher, D. (2011). Discrete-continuous optimization for large-scale structure from motion. *Computer Vision and Pattern Recognition (CVPR),* 2011 *IEEE Conference on,* (pp. 3001-3008).

Farenzena, M., Fusiello, A., & Gherardi, R. (2009). Structure-and-motion pipeline on a hierarchical cluster tree. *Computer Vision Workshops (ICCV Workshops),* 2009 *IEEE* 12*th International Conference on,* (pp. 1489-1496).

Funayama, R., Yanagihara, H., Van Gool, L., Tuytelaars, T., & Bay, H. (2010). U.S. Pat. No. EP1,850,270 B1.

Furukawa, Y., Curless, B., Seitz, S. M., & Szeliski, R. (2010). Towards internet-scale multi-view stereo. *Computer Vision and Pattern Recognition (CVPR),* 2010 *IEEE Conference on,* (pp. 1434-1441).

Fusiello, T. R. (2010). Photo-consistent planar patches from unstructured cloud of points. *European Conference on Computer Vision* (pp. 298-372). Springer.

Garland, M., & Heckbert, P. S. (1997). Surface simplification using quadric error metrics. *Proceedings of the 24th annual conference on Computer graphics and interactive techniques,* (pp. 209-216).

Gherardi, R., & Fusiello, A. (2010). Practical autocalibration. *Computer Vision—ECCV* 2010, (pp. 790-801).

Harris, C., & Stephens, M. (1988). A combined corner and edge detector. *Alvey vision conference,* 15, p. 50.

Hernandez Esteban, C., & Schmitt, F. (2004). Silhouette and stereo fusion for 3D object modeling. *Computer Vision and Image Understanding,* 367-392.

Hiep, V. H., Keriven, R., Labatut, P., & Pons, J.-P. (2009). Towards high-resolution large-scale multi-view stereo.

Computer Vision and Pattern Recognition, 2009. CVPR 2009. IEEE Conference on, (pp. 1430-1437).

Katz, S., Tal, A., & Basri, R. (2007). Direct visibility of point sets. ACM *Transactions on Graphics (TOG)*, 26, p. 24.

Kazhdan, M., Bolitho, M., & Hoppe, H. (2006). Poisson surface reconstruction. *Proceedings of the fourth Eurographics symposium on Geometry processing*, 7.

Laurentini, A. (1994). The visual hull concept for silhouette-based image understanding. *IEEE Transactions on pattern analysis and machine intelligence*, 16(2), 150-162.

Lindeberg, T. (1998). Feature detection with automatic scale selection. *International journal of computer vision*, 79-116.

Lowe, D. G. (1999). Object recognition from local scale-invariant features. *Computer vision, 1999. The proceedings of the seventh IEEE international conference on*, 2, pp. 1150-1157.

Lowe, D. G. (2004). U.S. Pat. No. 6,711,293 B1.

Popa, T., Germann, M., Keiser, R., Gross, M., & Ziegler, R. (2014). US Patent No. US20140219550 A1.

Seitz, S. M., Curless, B., Diebel, J., Scharstein, D., & Szeliski, R. (2006). A comparison and evaluation of multi-view stereo reconstruction algorithms. *Computer vision and pattern recognition, 2006 IEEE Computer Society Conference on*, (pp. 519-528).

Sinha, S. N., Steedly, D. E., & Szeliski, R. S. (2014). U.S. Pat. No. 8,837,811.

Tola, E., Lepetit, V., & Fua, P. (2010). Daisy: An efficient dense descriptor applied to wide-baseline stereo. *Pattern Analysis and Machine Intelligence, IEEE Transactions on*, 815-830.

Toldo, R., & Fusiello, A. (2008). Robust multiple structures estimation with j-linkage. *European conference on computer vision*, (pp. 537-547).

Toldo, R., & Fusiello, A. (2010). Photo-consistent planar patches from unstructured cloud of points. *European Conference on Computer Vision*, (pp. 589-602).

Toldo, R., Gherardi, R., Farenzena, M., & Fusiello, A. (2015). Hierarchical structure-and-motion recovery from uncalibrated images. *Computer Vision and Image Understanding*, 140, 127-143.

Tong, X., Li, J., Hu, W., Du, Y., & Zhang, Y. (2013). US Patent No. US20130201187.

Triggs, B. (1997). Autocalibration and the absolute quadric. *Computer Vision and Pattern Recognition, 1997. Proceedings., 1997 IEEE Computer Society Conference on*, (pp. 609-614).

Triggs, B., McLauchlan, P. F., Hartley, R. I., & Fitzgibbon, A. W. (1999). Bundle adjustment—a modern synthesis. *International workshop on vision algorithms*, (pp. 298-372).

Woodham, R. J. (1979). Photometric stereo: A reflectance map technique for determining surface orientation from image intensity. *22nd Annual Technical Symposium*, (pp. 136-143).

Wu, C. (2013). Towards linear-time incremental structure from motion. *3DTV-Conference, 2013 International Conference on*, (pp. 127-134).

The invention claimed is:

1. A computer-implemented method for creating a digital representation of at least an object surface of a physical object, the method comprising:
   obtaining input data, the input data including a plurality of captured images of the physical object and surface normal information of the object, the surface normal information representing object surface normals associated with respective parts of the object surface; and
   creating a digital 3D representation of at least the object surface;
wherein creating the digital representation of the object surface is based on at least the obtained plurality of captured images and the obtained surface normal information and comprises:
   obtaining an intermediate representation of the object surface, wherein the intermediate representation comprises a depth map indicative of distances from a reference position to respective positions on the object surface, the intermediate representation comprising a first part representing a first part of the object surface wherein the first part of the object surface comprises a hole in the depth map; and
   modifying the first part of the intermediate representation to obtain a modified representation;
wherein modifying the first part of the intermediate representation comprises:
   determining a second part of the object surface within a proximity of the first part of the object surface;
   determining, from the obtained surface normal information, one or more object surface normals associated with the determined second part; and
   modifying the first part of the intermediate representation based at least in part on the determined one or more object surface normals, wherein modifying the first part of the intermediate representation comprises filling the hole.

2. The method according to claim 1, wherein the plurality of captured images comprises images, captured from respective viewpoints relative to the physical objects.

3. The method according to claim 1, wherein each object surface normal is indicative of a direction of the object surface at a location on the object surface associated with the object surface normal.

4. The method according to claim 1, wherein obtaining the intermediate representation comprises creating the depth map from the plurality of images.

5. The method according to claim 1, wherein determining a second part of the object surface comprises identifying the hole as a hole to be filled and determining a periphery of the identified hole.

6. The method according to claim 5, wherein identifying the hole as a hole to be filled comprises:
   identifying the hole in the depth map; and
   determining, based on the obtained surface normal information, whether the identified hole is a hole to be filled.

7. The method according to claim 6, wherein determining whether the identified hole is a hole to be filled comprises:
   determining a first set of object surface normals associated with the determined periphery of the hole;
   computing a first similarity measure of the determined first set of surface normals; and
   comparing the computed first similarity measure with a first target similarity value.

8. The method according to claim 6, wherein determining whether the identified hole is a hole to be filled comprises:
   determining a second set of object surface normals associated with the identified hole;
   computing a second similarity measure of the determined second set of object surface normals; and
   comparing the computed second similarity measure with a second target similarity value.

9. The method according to claim 1, further comprising an optimization step for increasing a photoconsistency measure between the intermediate representation and the captured input data and/or a normal map derived from said surface normal information.

10. The method according to claim 9, wherein the photoconsistency measure comprises a consistency measure between the obtained surface normal information and surface normal information obtained from the intermediate representation.

11. The method according to claim 10, wherein modifying a first part of the intermediate representation comprises performing a bilateral filtering step.

12. The method according to claim 11, wherein the bilateral filtering step is followed by an optimization step for increasing a photoconsistency measure between the modified representation and the captured input data and/or a normal map derived from said surface normal information.

13. The method according to claim 11, wherein the intermediate representation defines a virtual surface and comprises a mesh of surface elements, the mesh defining a mesh topology, each surface element defining a virtual surface normal, each surface element comprising a plurality of vertices, each vertex defining a position on said virtual surface; wherein the bilateral filtering step comprises modifying a position of at least a first vertex of said plurality of vertices by a vertex displacement computed to reduce a difference measure between an object surface normal determined from the obtained surface normal information and a virtual surface normal; wherein the vertex displacement is restrained by the mesh topology.

14. The method according to claim 13, wherein the first vertex is associated with one or more surface elements and wherein vertex displacement is scaled by a size of the one or more surface elements associated with the first vertex.

15. The method according to claim 11, wherein the bilateral filtering step comprises selecting one of the object surface normals represented by the obtained surface normal information and associating the selected surface normal with a surface element associated with the first vertex.

16. A system for creating a digital representation of a physical object, the system comprising a data processing system configured to perform the steps of the method defined in claim 1.

17. The system according to claim 16, further comprising a scanning station comprising an object support for receiving a physical object.

18. The system according to claim 16, further comprising an image capturing device operable to capture two or more images of a physical object, wherein the two or more images are taken from different viewpoints relative to the physical object.

19. The system according to claim 16, further comprising a plurality of toy construction elements configured to be detachably interconnected with each other so as to form a physical object in the form of a toy construction model.

20. A non-transitory computer-readable medium having a computer program product stored thereon, the computer program product comprising program code means adapted to cause, when executed on a data processing system, said data processing system to perform the steps of the method defined in claim 1.

21. A method for creating a digital representation of a least an object surface of a physical object, the method comprising:
 obtaining input data, the input data including a plurality of captured images of the physical object and surface normal information of the object, the surface normal information representing object surface normals associated with respective parts of the object surface;
 creating a digital representation of the object surface;
 wherein creating the digital representation is based on at least the obtained plurality of captured images and the obtained surface normal information and comprises:
  obtaining an intermediate representation of the object surface; and
  modifying, based at least in part on the obtained surface normal information, a first part of the intermediate representation to obtain a modified representation, the first part of the intermediate representation representing a first part of the object surface;
 wherein modifying the first part of the intermediate representation comprises an optimization step for increasing a photoconsistency measure between the intermediate representation and a normal map derived from said surface normal information.

* * * * *